United States Patent [19]
Rolchigo et al.

[11] Patent Number: 5,254,250
[45] Date of Patent: Oct. 19, 1993

[54] ROTARY FILTRATION DEVICE AND FILTER PACK THEREFOR

[75] Inventors: Philip M. Rolchigo, Edison; Leonard T. Hodgins, Closter; Malcolm R. Kahn, Franklin Lakes, all of N.J.

[73] Assignee: Membrex, Inc., Fairfield, N.J.

[21] Appl. No.: 884,079

[22] Filed: May 15, 1992

Related U.S. Application Data

[63] Continuation-in-part of Ser. No. 708,069, May 30, 1991, Pat. No. 5,143,630.

[51] Int. Cl.$^5$ ............................................. B01D 63/16
[52] U.S. Cl. ............................... 210/321.67; 210/330
[58] Field of Search ............. 210/780, 232, 641, 361.6, 210/361.64, 321.67, 321.68, 321.72, 321.75, 321.84, 330, 331

[56] References Cited

U.S. PATENT DOCUMENTS

| | | |
|---|---|---|
| 3,477,575 | 11/1969 | Nemec et al. |
| 4,025,425 | 5/1977 | Croopnick et al. |
| 4,132,649 | 1/1979 | Croopnick et al. |
| 4,216,094 | 8/1980 | Solum |
| 4,330,405 | 5/1982 | Davis et al. |
| 4,376,049 | 3/1983 | Valentine |
| 4,708,797 | 11/1987 | Baur et al. |
| 4,717,485 | 1/1988 | Brunsell et al. |
| 4,781,835 | 11/1988 | Bahr et al. |
| 4,790,942 | 12/1988 | Shmidt et al. |
| 4,867,878 | 9/1989 | Rashev |
| 4,876,013 | 10/1989 | Shmidt |
| 4,906,379 | 3/1990 | Hodgins et al. |
| 4,911,847 | 3/1990 | Shmidt et al. |
| 4,950,403 | 8/1990 | Hauff et al. |
| 5,000,848 | 3/1991 | Hodgins et al. |

FOREIGN PATENT DOCUMENTS

| | | |
|---|---|---|
| 258313 | 11/1967 | Austria |
| 1057015 | 2/1967 | United Kingdom |

OTHER PUBLICATIONS

Murkes & Carlsson, *Crossflow Filtration*, (1988).
Schweigler & Stahl, "High Performance Disc Filter For Dewatering Mineral Slurries" *Filtration & Separation*, pp. 38–41, Jan./Feb. 1990.
Parkinson, "Novel separator makes its debut," *Chemical Engineering*, 1-page reprint (Jan. 1989).
AquaTechnology, "How to keep your fluid processing budget from going to waste," 3-page brochure.
AquaTechnology, "Technology Background," 4-page brochure.
Ingersoll-Rand, "Upgrade your entire filtering and/or washing operation with the new Artisan Dynamic Thickener/Washer", Bulletin 4081, 4 pages (Feb. 1986).

(List continued on next page.)

*Primary Examiner*—Frank Sever
*Attorney, Agent, or Firm*—Bryan Cave

[57] ABSTRACT

A rotary filtration system comprising a device having a fluid filtration gap between a filter and a rotating member (e.g., a disc), a filter pack for use in the rotary filtration device, and a cartridge formed by structurally connecting (and optionally fluidly connecting) two or more of the filter packs is disclosed. In the filter pack, the filter lies adjacent a permeate collection member, which also desirably can support the filter. The permeate collection member has one or more passageways for collecting the permeate that flows through the filter and is connected to a permeate collection header in the device. The filter pack and device are designed so that the filter pack may be easily inserted into and removed from the device, preferably by moving the filter pack in a direction generally perpendicular to the longitudinal axis of the shaft that rotates the rotating member. Desirably the rotating member and/or filter has one or more spiral grooves in fluid communication with fluid in the gap. Several rotating members and filter packs may be interleaved to increase filtration device capacity and make more efficient use of equipment space. In such a device, the rotating members can be mounted on a common shaft for rotation in unison and can have spiral grooves on both major faces of each rotating member.

37 Claims, 9 Drawing Sheets

OTHER PUBLICATIONS

Ingersoll-Rand, "Patented filter/wash capability permits simultaneous washing and filtering," Bulletin 4060, 4 pages (Aug. 1983).

Wronski et al., "Dynamic Filtration in Biotechnology," *Bioprocess Engineering*, vol. 4, pp. 99–104 (1989).

Wronski et al., "Resistance Model for High-Shear Dynamic Filtration" *Filtration & Separation*, pp. 418–420 (Nov./Dec. 1989).

Rudniak et al., "Dynamic Microfiltration in Biotechnology," *Proc. 1st Event; Bioprocess Engineering,* Jun. 26–30, 1989.

Molga et al., "Dynamic Filtration in Obtaining High-Purity Materials, etc." *Proc. Royal Flemish Society of Engineers,* Oct. 1988, vol. 4, pp. 69–77.

Wronski et al., "Filtracja dynamiczna roztworow polimerow" *Inz. i Ap. Chem.*, No. 1, pp. 7–10 (1983).

Wronski et al., "Problems of Dynamic Filtration," Rep. Inst. ChemEngr., Warsaw Technical Univeristy, T.XI, Z.3-4, pp. 71–91 (1982).

Shirato et al., "Patterns of Flow in a Filter Chamber During Dynamic Filtration with a Grooved Disk," *Int'l Chem. Eng.*, vol. 27, pp. 304–310 (1987).

Watabe, "Experiments on the Fluid Friction of a Rotating Disc with Blades" *Bull. JSME,* vol. 5, No. 17, pp. 49–57 (1962).

Snowman, "Sealing Technology In Lyophilizers," *Bioprocess Engineering Symposium*, ASME pp. 81–86 (1989).

Wisniewski, "Anticipated Effects Of Seal Interface Operating Conditions On Biological Materials", *Bioprocess Engineering Symposium* ASME pp. 87–96 (1989).

Lebeck, *Principles and Design Of Mechanical Face Seals,* pp. 6, 17–20, 107, 146 (1991).

Todhunter, "Improving The Life Expectancy Of Mechanical Seals in Aseptic Service," *Bioprocess Engineering Symposium,* ASME pp. 97–103 (1989).

Fodor, "Mechanical Seals: Design Solutions For Trouble Free Sterile Applications," *Bioprocess Engineering Symposium* ASME, pp. 89–98 (1990).

Wronski et al., "Power Consumption in Dynamic Disc Filters," *Filtration & Separation*, pp. 397–399 (Nov./Dec. 1984).

ROTARY FILTRATION DEVICE AND FILTER PACK THEREFOR

RELATED APPLICATIONS

This application is a continuation-in-part of commonly assigned U.S. patent application Ser. No. 708,069, filed May 30, 1991, now U.S. Pat. No. 5,143,630, which application and patent are incorporated herein in their entirety for all purposes.

BACKGROUND OF THE INVENTION

This invention concerns the field of filtration and more specifically, filtration using rotary disc devices containing filters.

Filtration devices are used to separate one or more components of a fluid from other components. Common processes carried out in such devices include classic filtration, microfiltration, ultrafiltration, reverse osmosis, dialysis, electrodialysis, pervaporation, water splitting, sieving, affinity separation, affinity purification, affinity sorption, chromatography, gel filtration, and bacteriological filtration. As used herein, the term "filtration" includes all of those separation processes as well as any other processes using a filter that separate one or more components of a fluid from the other components of the fluid.

Filtration processes make use of the greater filter permeability of some fluid components than others. As used herein, the term "filter" includes any article made of any material that allows one or more components of a fluid to pass through it to separate those components from other components of the fluid. Thus, the term "filter" includes metallic and polymeric cloth filters, semipermeable membranes and inorganic sieve materials (e.g., zeolites, ceramics). A filter may have any shape or form, for example, woven or non-woven fabrics, fibers, fiber bundles, membranes, sieves, sheets, films, rods, and combinations thereof.

The components of the fluid that pass through the filter comprise the "permeate" and those that do not pass (i.e., are rejected by the filter or are held by the filter) comprise the "retentate." The valuable fraction from the filtration process may be the retentate or the permeate or in some cases both may be valuable.

A common problem in all filtration devices is blinding or clogging of the filter. Permeate passing through the filter from the fluid layer adjacent to the feed side of the filter leaves a retentate layer adjacent to or on that side of the filter having different composition than that of the bulk feed fluid. This material may bind to the filter and clog its pores (that is, foul the filter) or remain as a stagnant boundary layer, either of which hinders transport of the components trying to pass through the filter to the permeate product side of the filter. In other words, the mass transport rate through the filter per unit membrane area (i.e., flux) is reduced and the inherent sieving capability of the filter is adversely affected.

Generally, fouling of the filter is chemical in nature, involving chemisorption of substances in the feed fluid onto the filter's internal (pore) and external surface area. Unless the chemical properties of the filter surface are altered to prevent or reduce adsorption, frequent and costly filter replacement or cleaning operations are necessary.

One of the most common causes of fouling arises from the low surface energy (e.g., hydrophobic nature) of many filters. U.S. Pat. Nos. 4,906,379 and 5,000,848, which are commonly assigned with this application, disclose chemical modification to increase the surface free energy (e.g., hydrophilicity) of filter surfaces. In general, however, relatively little attention has been given to modifying surface chemistry to reduce filter fouling. (U.S. Pat. Nos. 4,906,379 and 5,000,848 and all of the other patent documents, publications, and other documents cited in this application are incorporated herein by reference in their entireties for all purposes.)

In contrast to the chemical nature of most fouling problems, the formation of a boundary layer near the surface of the filter is physical in nature, arising from an imbalance in the mass transfer of feed fluid components towards the filter surface as compared to the back-transfer from the boundary layer to the bulk feed fluid. Some form of force (for example, mechanical, electrokinetic) must be used to promote the desired mass transfer away from the filter surface. Unfortunately, few strategies have been developed that promote adequate back-mixing to reduce the boundary layer or prevent its formation.

The most common strategy is called "cross-flow" filtration ("CFF") or "tangential flow" filtration ("TFF"). In principle, the feed fluid is pumped across (i.e., parallel to) the outer surface of the filter at a velocity high enough to disrupt and back-mix the boundary layer. In practice, however, cross-flow has several disadvantages and cannot be used at all in certain cases.

A different approach to eliminating the stagnant boundary layer involves decoupling the feed flow rate from the applied pressure. With this approach, a structural element of the filtration device, rather than the feed fluid, is moved to effect back-mixing and reduction of the boundary layer. The moving body may be the filter itself or a body located near the filter element.

Filter devices utilizing movement of a structural element/mechanical agitation are known. In the rotary filtration devices of commonly assigned U.S. Pat. Nos. 4,790,942, 4,867,878, 4,876,013, 4,911,847, and 5,008,848, at least one element defining the fluid filtration gap moves with respect to another element that also defines the gap. For example, one cylinder rotates within another cylinder to create hydrodynamic Taylor vortices in the fluid in the annular gap between the cylinders. Those vortices help reduce or eliminate the stagnant boundary layer near the surface of a filter located on a cylindrical surface defining the filtration gap.

In U.S. Pat. No. 4,216,094 a sector body for use in a rotary disc dewatering device has radially extending grooves. Any slackness in the filter medium fabric covering the sector body is gathered into the radial grooves.

U.S. Pat. No. 4,330,405 concerns a rotating vacuum disc filter divided into segments by means of grooved radial arms that are designed to receive caulking media for holding a filter cloth on each of the segments.

U.S. Pat. No. 4,376,049 concerns a rotary apparatus having a circular design. Centrifugal forces cause permeate to flow from the center of the rotor plate through the rotating filter elements. The vanes on the rotor plate holding the filter elements are curved rearwardly with respect to the forward direction of rotation. The curvature helps retain the filter elements in place and enhances the pumping capability of the system as the rotor is rotated in the forward direction. The filter elements eventually become clogged or packed with material and must be replaced.

U.S. Pat. No. 4,708,797 concerns a rotary disc filter element having supporting mesh between the bottom plate and the filter mesh. The bottom plate is stiffened by corrugations, which extend radially and coaxially of the hub.

U.S. Pat. No. 4,781,835 concerns a disc concentrator in which filter chambers composed of two adjacent filter discs are attached to a drum-like filtrate collection chamber and are adapted to rotate therewith. The filtrate passes through the filter discs and enters the collection chamber, from which the filtrate flows into a collection space.

U.S. Pat. No. 4,950,403 concerns a screen segment for rotary disc filters or thickeners.

U.K. Pat. No. 1,057,015 concerns a rotary filtration device for dynamic filtration of slurries in which a filtration body carrying the filter rotates. A stationary member inside the rotating filtration body may be used to help discharge the permeate that collects inside the filtration body.

In U.S. Pat. No. 3,477,575 one set of filter elements is mounted on a common shaft for rotation. A second set of filter elements is fixed on the inner wall of the device, and the rotatable and stationary filter elements are interleaved to create a serpentine flow path along which the feed fluid flows. Permeate is withdrawn through both sets of filters.

This type of filtration device was commercialized by the Swiss company Willi Bachofen. Because of the interleaving of the two sets of filter elements and because of the location of the feed fluid inlet and outlet, a substantial portion of the feed fluid flow is generally parallel to the major surfaces of the filters. Thus, although this device uses rotation of mechanical elements (one set of filters), it also uses cross-flow to help reduce stagnation at the fluid/filter interface.

Historically, such rotary filters have been used at relatively low rotation rates to dewater suspensions in so-called cake filtration (see Schweigler and Stahl, "High Performance Disc Filter for Dewatering Mineral Slurries," *Filtration and Separation,* January/February, pages 38-41 (1990)). See also Ingersoll-Rand, "Upgrade your entire filtering and/or washing operation with the new Artisan Dynamic Thickener/Washer," Bulletin No. 4081, 4 pages (2/86); and Ingersoll-Rand, "Patented filter/wash capability permits simultaneous washing and filtering," Bulletin No. 4060, 4 pages (8/83).

Another strategy for reducing the stagnant boundary layer adjacent to a rotating filter surface is to use high filter rotation rates, e.g., 1000 rpm. See Parkinson, "Novel Separator Makes Its Debut," Chemical Engineering (January 1989), 1-page reprint by Aqua Technology Resource Management, Inc.; Aqua Technology Resource Management, Inc., "How to Keep Your Fluid Processing Budget from Going to Waste," 3-page brochure; and Aqua Technology Resource Management, Inc., 4-page brochure (untitled) discussing "Technology Background," "Overcoming Concentration Polarization," etc. However, use of a rotating filter element is complicated by the need for adequate rotary sealing means to maintain the separation of feed fluid from permeate. Also, the rotating filter and sealing means need to be strong enough to withstand centrifugal forces.

An alternative disc filter design utilizes a stationary filter and a closely spaced non-filter rotating element. Wronski, Molga, and Rudniak, "Dynamic Filtration in Biotechnology," *Bioprocess Engineering,* Volume 4, pages 99-104 (1989), report testing such a device against a device that has a stationary filter and an oppositely disposed rotating disc filter, and against a cross-flow device, and against a rotating cylindrical filtration device. See also Wronski and Mroz, "Power Consumption in Dynamic Disc Filters," *Filtration & Separation,* November/December, pages 397-399 (1984); Wronski, Rudniak, and Molga, "Resistance Model for High-Shear Dynamic Microfiltration," *Filtration & Separation,* November/December, pages 418-420 (1989); Rudniak and Wronski, "Dynamic Microfiltration in Biotechnology," *Proceedings 1st Event: Bioprocess Engineering,* Institute of Chemical and Process Engineering, Warsaw University of Technology, Warsaw, Poland, June 26-30, 1989; Molga and Wronski, "Dynamic Filtration in Obtaining of High Purity Materials—Modelling of the Washing Process," *Proceedings of the Royal Flemish Society of Engineers,* Antwerp, Belgium, October 1988, Volume 4, pages 69-77; Wronski and Mroz, "Problems of Dynamic Filtration," *Reports of the Institute of Chemical Engineering,* Warsaw Techn. Univ., T.XI, Z. 3-4, pages 71-91 (1982); and Wronski, "Filtracja dynamiczna roztworow polimerow," *Inz. i Ap. Chem.,* number 1, pages 7-10 (1983).

Murkes and Carlsson, *Crossflow Filtration—Theory and Practice,* 133 pages, John Wiley & Sons, New York (1988), particularly pages 22-26 and 69-125 and most particularly in Section 3.5 at pages 93-100, disclose that the flux of a stationary filter can be enhanced by rotating various elements near the stationary filter. The elements reported to have been tested include a cross, a double cross, a propeller, a spoke wheel, and discs either flat (plain) or having radial blades (vanes extending from the plane of the disc). See also Watabe, "Experiments on the Fluid Friction of a Rotating Disc with Blades," *Bulletin of JSME,* Volume 5, number 17, pages 49-57 (1962); and Shirato, Murase, Yamazaki, Iwata, and Inayoshi, "Patterns of Flow in a Filter Chamber during Dynamic Filtration with a Grooved Disk," *International Chem. Eng.,* Volume 27, pages 304-310 (1987).

Conventional rotating disc filter devices utilize stacked filter disc arrangements. Historically, most of these devices comprise disc filters that are rotated by a central drive shaft to which the filter elements are attached. Some rotating disc devices utilize stationary filter discs separated from each other by rotary elements attached to the shaft. Murkes and Carlsson, above, FIG. 3.15 at page 91. In this type of device the stationary filter element surrounds the central rotating drive shaft. Accordingly, to change filters requires disassembly of the device followed by sequential removal of rotors and filters from the stacked array. For example, to remove the nth filter requires removing n-1 rotors and filters. This obviously is a significant disadvantage of such a design because of the labor and downtime involved.

Devices in which the filter holding means is an integral part of the segmented vessel housing (e.g., containment vessel wall) also have drawbacks. See, e.g., Murkes and Carlsson, above, FIGS. 3.11 to 3.14 (pages 87-90). As in the previous case, to change the nth filter requires removal of n-1 segments as well as rotors. Also, scale-up is limited by engineering tolerances. Furthermore, adding more segments to increase the capacity of the device requires additional seals, thereby increasing the risk of device failure.

In conventional disc filters where either the permeate or the feed fluid is routed within the rotating shaft, seals must be provided to keep permeate from mixing with feed fluid. Seals can have no moving parts (stationary seals) or can have moving parts (mechanical seals, e.g., dynamic seals). Some types can act as either stationary or mechanical seals (for example, O-rings and face seals).

U.S. Pat. Nos. 4,025,425 and 4,132,649 concern purification devices each having a stack of filter or membrane packs. Each multilayer pack comprises membranes, filter paper, and support sheets. Each stack is rotated to provide centrifugal force that helps sweep away membrane-plugging material. Holes in the packs are aligned to provide conduits ("pipes") for fluid flow (e.g., concentrate removal). Stationary seals, namely, gaskets, separate feed/retentate from permeate.

U.S. Pat. No. 4,717,485 concerns a rotary separation device having a chamber with a plurality of porous filter discs capable of rotating around a common central passage. An inlet introduces fluid into the interior of the chamber near the central passage of the discs. Centrifugal force helps move any solids in the feed fluid towards the periphery of the discs and also forces filtrate or permeate, which is collected inside the discs after passing through the filters mounted thereon, to the periphery of the discs, where it is collected in a permeate collection manifold or header. Reference is made to "free rotational seals" (column 4, line 48) and to stationary seals (e.g., column 5, lines 3-6). Some type of stationary seal must also be used where the discs are connected to the permeate collection manifold.

However, mechanical seals typically exhibit at least some leakage and must be replaced at regular intervals. Lebeck, *Principles and Design of Mechanical Face Seals*, pages 17-20, 107, 146 (John Wiley & Sons, Inc. 1991); Wisniewski, "Anticipated Effects of Seal Interface Operating Conditions on Biological Materials," *Bioprocess Engineering Symposium*, The American Society of Mechanical Engineers (1989), pages 87-96; Todhunter, "Improving the Life Expectancy of Mechanical Seals in Aseptic Service," *Bioprocess Engineering Symposium*, The American Society of Mechanical Engineers (1989), pages 97-103; Fodor, "Mechanical Seals: Design Solutions for Trouble Free Sterile Applications," *Bioprocess Engineering Symposium*, The American Society of Mechanical Engineers (1990), pages 89-98; Snowman, "Sealing Technology in Lyophilizers," in *Bioprocess Engineering Symposium*, The American Society of Mechanical Engineers (1989), pages 81-86 Alternatively, fluidic magnetic seals, which have zero leakage, tolerate only small pressure differences and the ferro fluid used in the seal must be compatible with the process fluid. Lebeck, *Principles and Design of Mechanical Seals*, above, page 6. Accordingly, it is desirable to avoid such seals for separating permeate and feed fluid.

The effectiveness of rotating disc filter devices depends in large part upon the flowpaths of the feed, retentate, and permeate fluids. For example, the feed fluid may enter at the top of the device and pass downward adjacent to succeeding filter discs (see the diagram of a serially arranged device in FIG. 3.4 at page 78 of Murkes and Carlsson). Along such a flowpath, the feed must fight the natural outward pumping action of the discs at every other filter stage (i.e., at those stages in which the feed is supposed to flow from the circumference of the filter surface towards the center). Consequently, the potential for feed materials to deposit upon the filter surface is increased as the feed is concentrated and thereby becomes more viscous. Thus, the stages where the feed must flow against the outward pumping action of the disc will experience more deposition than the stages where the feed flows with the pumping action of the disc. Accordingly, performance of the filtration device will be non-uniform and will depend greatly on the viscosity and solids concentration of the feed.

Alternatively, a parallel feed arrangement, such as the one shown in the left side of FIG. 3.7 at page 81 of Murkes and Carlsson can be used to deliver the feed and recover retentate and permeate. However, with this scheme, the feed fights the natural outward pumping action of the rotating discs at every stage. Consequently, the performance of the entire device will be compromised as the feed solids content and viscosity increase. This decline in performance is further aggravated because at the same time the feed fluid/retentate is becoming more concentrated as it moves towards the shaft, that progressively concentrated fluid is entering zones of decreasing filtration efficiency (the cleaning forces on the filter decrease as the fluid moves from the circumference towards the shaft because local linear velocity decreases).

Means to overcome the potential for buildup of rejected species caused by the flowpath limitations discussed above may involve changing either the rotating disc design (e.g., adding blades or grooves), or changing the feed pathways, or both. Such pathways may involve hollow rotating shafts having ports (or nozzles) to direct the feed to either or both sides of the filter members (parallel arrangement). However, this approach weakens the shaft, increases its complexity, and hence increases its cost. Additionally, this porting arrangement may result in zones of high turbulence at the injection point. Such high shear zones are undesirable for shear-sensitive materials.

Despite all of these designs there is a continuing need for mechanically agitated disc filters that, among other things, allow unobstructed access to each filter element, enable relatively easy and rapid replacement of individual filter elements and minimize the time required for such operations, provide more reliable means for isolating (i.e., sealing) the permeate from the feed fluid/retentate, introduce feed fluid near the rotor shaft, permit permeate composition to be monitored for each filter, and allow individual filter elements to be isolated during operation (for example, in case of a leak in one of the filter elements) without having to shut down the entire device.

SUMMARY OF THE INVENTION

A rotary filtration device that satisfies those needs and provides other advantages has now been developed. Broadly, the device is a rotary filtration device for filtering fluid into permeate and retentate, said device comprising (a) a readily insertable and removable filter pack, the filter pack being essentially stationary in the device during normal operation and comprising a first filter and a permeate collection member having a first major surface, the first filter being adjacent the first major surface; (b) a permeate collection header; (c) a first rotating member; and (d) a rotatable shaft having a longitudinal axis to which shaft the rotating member is attached and by which shaft it is rotated during normal operation; the first rotating member being near the first filter to define a first fluid filtration gap therebetween when the filter pack is in its normal operating position in the device; the permeate collection member having at least one passageway for permeate and also having fluid connection means for fluidly connecting the passageway to the permeate collection header when the filter pack is in its normal operating position so that permeate that passes from the fluid filtration gap through the filter and into the passageway of the permeate collection member can flow into the permeate collection header during normal operation; the device having means to allow the filter pack to be readily inserted into and removed from its normal operating position in the device by moving the filter pack in a direction generally perpendicular to the longitudinal axis of the shaft without having to move the rotating member out of the path of the filter pack during its insertion or removal. Thus, it is not necessary to remove the rotatable shaft, bearings, seals, or rotors (rotating discs).

In another aspect, the present invention concerns a readily insertable and removable filter pack for use in a rotary filtration device for filtering fluid into permeate and retentate, the filter pack being essentially stationary in the device during normal operation and comprising first and second filters and a permeate collection member having first and second major surfaces and a third surface, the first filter being adjacent the first major surface and the second filter being adjacent the second major surface; said device having a permeate collection header, first and second rotating members, and a rotatable shaft having a longitudinal axis to which shaft the rotating members are attached and by which shaft they are rotated during normal operation; the first rotating member being near the first filter to define a first fluid filtration gap therebetween and the second rotating member being near the second filter to define a second fluid filtration gap therebetween when the filter pack is in its normal operating position in the device; the permeate collection member having at least one passageway for permeate and also having fluid connection means in its third surface for fluidly connecting the passageway to the permeate collection header when the filter pack is in its normal operating position so that permeate that passes from the fluid filtration gaps through the filters and into the passageway of the permeate collection member can flow into the permeate collection header during normal operation; the device and the filter pack having means to allow the filter pack to be readily inserted into and removed from its normal operating position in the device without having to move the rotating members out of the path of the filter pack during its insertion or removal.

In yet another aspect, the present invention concerns a cartridge for a rotary filtration device comprising a plurality of the filter packs wherein the filter packs are structurally connected so that they can be readily inserted into and removed from the rotary filtration device as a unit. Desirably, the cartridge further comprises means to fluidly connect to each other the permeate passageways of the filter packs in the cartridge.

In preferred embodiments the rotary filtration device comprises means for automatically fluidly connecting the fluid connection means to the permeate collection header as the filter pack is inserted into its normal operating position in the device; and/or the first major surface and fluid connection means of the filter pack are oriented so that when the filter pack is inserted into the device the first filter of the filter pack is substantially perpendicular to the longitudinal axis of the shaft and the fluid connection means is automatically fluidly connected to the permeate collection header.

In other preferred embodiments, the first major surface of the filter pack is generally D-shaped. Alternatively, the first major surface of the permeate collection member may be generally circular and contain a radial cutout extending from its circumference to its center, the cutout having a side surface and being sufficiently large to provide clearance for the rotatable shaft when the filter pack is inserted into its normal operating position.

If the first major surface is D-shaped, the permeate collection member may comprise a generally straight and planar member, the fluid connection means may comprise at least part of that member, and that member may be adjacent the permeate collection header when the filter pack is in its normal operating position in the device. The permeate collection header may be generally parallel to the longitudinal axis of the shaft and possibly contain an enlarged portion encircling the shaft. Desirably two such D-shaped members are used, each one having its long straight side connected to the header so as to form a filtration area that is approximately circular in cross-section (minus the cross-sectional area of the header).

With an alternative and preferred D-shaped filter pack (described below), the rotary filtration device uses two of those filter packs and each has a periphery comprising an essentially straight portion and a cutout to provide clearance for the shaft. When the two filter packs are in their normal operating positions in the device, they lie in substantially the same plane, their respective straight portions are adjacent one another (without any header inbetween), and their two cutouts are adjacent the shaft but spaced therefrom to form an open region around the shaft. Desirably, the straight portion of the periphery of each filter pack may have an elongate recess in communication with the cutout so that when the two filter packs lie in the device in their normal operating position (with their respective straight portions adjacent one another), the two elongate recesses of the two filter packs form a passageway for the fluid to be filtered to enable that feed fluid to be delivered to the open region around the shaft.

If the permeate collection member is generally circular and has the above-described radial cutout, the rotary filtration device has a first member that fits within the radial cutout when the filter pack is inserted into its normal operating position in the rotary filtration device, which first member has means to help maintain the filter pack in its normal operating position in device. The first member that fits within the radial cutout and the side surface of the cutout may have means that cooperate with each other to allow the filter pack to be slid into and out of the device in a direction generally perpendicular to the longitudinal axis of the shaft for inserting the filter pack into and removing it from its normal operating position in the device and for maintaining the filter pack in its normal operating position in the device. The first member that fits within the radial cutout may have means for feeding fluid to be filtered to the fluid filtration gap near the rotatable shaft Regardless of the shape of the permeate collection member, it may have a second major surface, the filter pack may have a second filter adjacent the second major surface, and the two filters of the filter pack may be substantially parallel The rotary filtration device may have a plurality of filter packs and a plurality of rotating members in alternating interleaved arrangement to define a plurality of fluid filtration gaps. The rotary filtration device may have means to allow any gas within the passageway of the permeate collection member to be removed.

The collection header may be at least partially inside the device and adjacent the rotatable shaft of the device, and the fluid connection means of the filter pack may connect to the permeate collection header inside the device.

In a preferred embodiment, the longitudinal axis of the shaft is generally horizontal when the device is in its normal operating position, the first filter of the filter pack is generally vertical when the filter pack is in its norma operating position in the device, and the fluid connection means for conveying permeate from the permeate collection member to the permeate collection header is located near the bottom of the permeate collection member when it is in its normal operating position in the device.

Regardless of the shape of the permeate collection member, it is desirable to remove gas (e.g., air) from the member before the start of filtration. If there are ports at the top and bottom of the filter pack, they may be used to flush air from the member by forcing liquid through the bottom port and out the top port. A high flow of liquid out the top port will entrain and carry with it the trapped gas. Similarly, if the filter pack has two bottom permeate connections, liquid may be forced into one of the fluid connections at a high enough velocity to sweep trapped gas along with the liquid out through the other fluid connection.

The rotary filtration device may have entry means (e.g., a door or hinged member) that can be in an open position or in a closed position and which when in the open position allows the filter pack to be inserted into or removed from the rotary filtration device and which when in the closed position helps maintain the filter pack in its normal operating position. The entry means when in its closed position may help maintain the fluid connection of the fluid connection means to the permeate collection header.

The rotating member itself may have a filter for withdrawing permeate. In preferred embodiments, the rotating member has one or more spiral grooves.

BRIEF DESCRIPTION OF THE DRAWINGS

To facilitate further description of the invention, the following drawings are provided in which.

Figure 1:
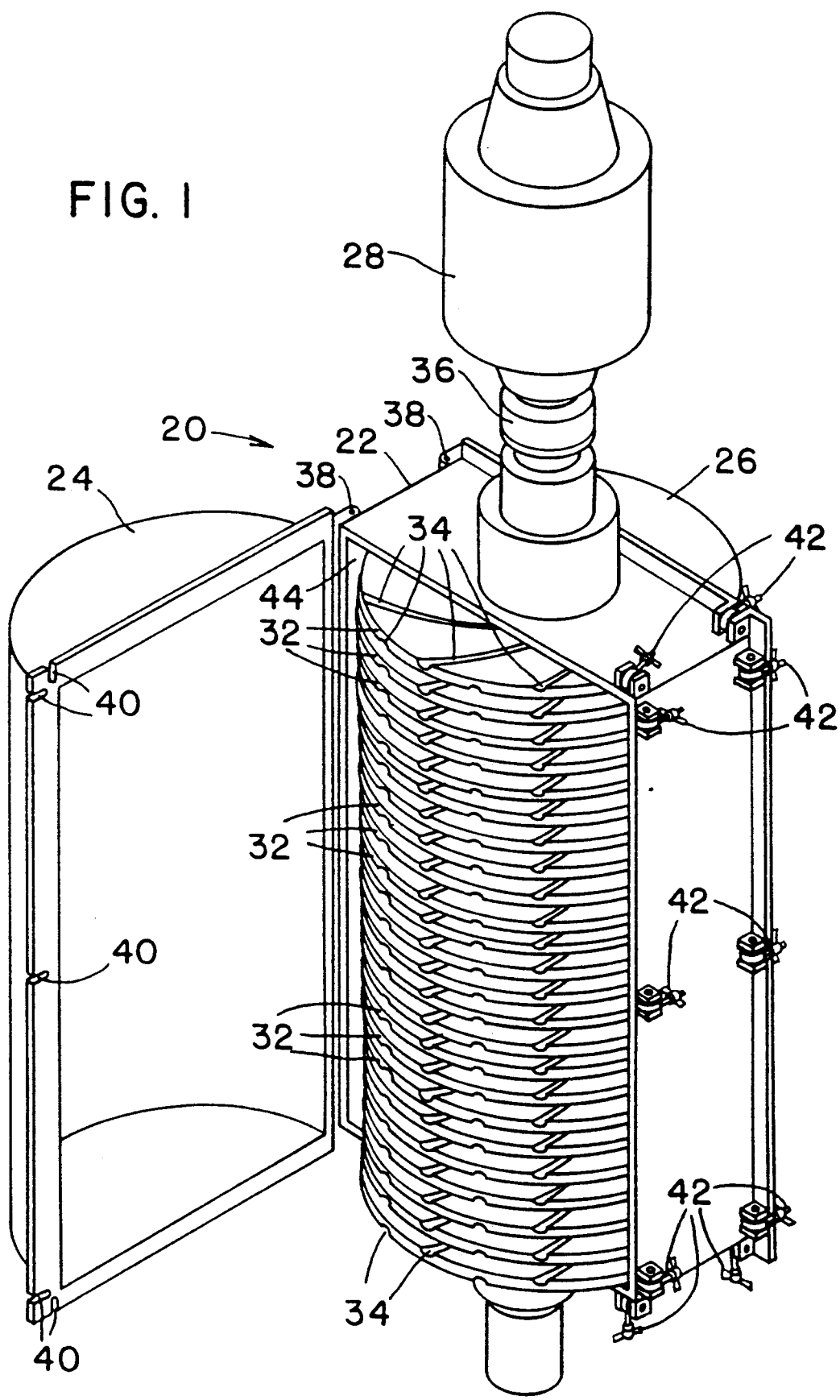
FIG. 1 is a perspective view of a rotary filtration device of this invention.

These drawings are provided for illustrative purposes only and should not be used to unduly limit the scope of the invention.

DETAILED DESCRIPTION OF THE INVENTION

The designs of the rotary filtration device, filter pack, and cartridge of this invention are not critical and any designs may be used so long as they satisfy the criteria specified in the claims. Generally speaking, the device has at least two members with oppositely disposed facing surfaces (at least one of which members carries a filter and is essentially stationary during normal operation and the other of which members rotates) that together define a fluid filtration gap, the major plane of which gap may be substantially parallel to the two facing surfaces defining the gap, and the device and filter pack are designed so that the filter pack can be easily inserted into and removed from the device. Desirably the filter pack is inserted into and removed from the device by moving the filter pack in a direction generally perpendicular to the longitudinal axis of the shaft that rotates the rotating member (e.g., a rotary disc). Desirably the rotating member is closely spaced to the filter surface and its plane of rotation is substantially parallel to the plane of the filter. Desirably, at least one of the surfaces defining the fluid filtration gap has at least one spiral groove, although that is not necessary because the present invention may be embodied in rotary filtration devices that do not have any spiral grooves. Thus, the rotating member or the stationary filter may both have one or more spiral grooves, only one may have one or more spiral grooves, or neither may have any spiral grooves. It is also within the scope of this invention to have the rotating member itself also be at least in part a filter surface, although that is not preferred.

Use of the term "rotating member" does not preclude its surface facing and helping to define the filtration gap from also being a filter surface and/or from having one or more grooves, blades, or other protuberances or concavities. Similarly, use of the term "filter" to refer to a mechanical element through which permeate passes and whose surface is the second surface facing and helping to define the fluid filtration gap does not preclude the filter surface from having one or more grooves, blades, or other protuberances or concavities.

The term "essentially stationary" as applied to a filter, filter pack, or cartridge means that during the normal filtration operation, the filter, filter pack, or cartridge may vibrate to some extent but that it does not rotate. References to the filter, filter pack, or cartridge of this invention being stationary should also be understood to mean that the filter, filter pack, or cartridge does not rotate.

The term "substantially parallel" means that the two lines or planes or elements or members that are "substantially parallel" do not form an angle with each other greater than about 30° ("substantially parallel" is further defined below).

The term "oppositely disposed" means that, for example, two surfaces are on opposite sides of the same element, for example, the two major faces of a sheet of paper are oppositely disposed, or that two elements face one another across some gap or boundary, for example, the surface of a disc (rotating member) and the surface of a filter on opposite sides of a fluid filtration gap (that is, defining a fluid filtration gap) are oppositely disposed.

The term "closely spaced" means that two lines or planes or elements or members are not so far apart that they can not interact or work together to perform a desired function. Thus, in the case of the facing surfaces of a disc (rotating member) and filter, "closely spaced" usually means that those surfaces are not more than about 100 millimeters apart, and in that context, "closely spaced" is further defined below.

The term "generally perpendicular" as used herein (usually in the context of describing the direction in which a filter pack or cartridge is moved with respect to the longitudinal axis of the rotatable shaft of the filtration device) means that one member or element or line of direction or plane forms an angle with respect to another member or element or line of direction or plane of less than 45°, usually 30° or less, desirably 20° or less, more desirably 15° or less, preferably 10° or less, more preferably 5° or less, and most preferably essentially zero degrees.

The term "normal operation" refers to the filtration operations carried out using apparatus of this invention. The term "normal operating position" when referring, for example, to the normal operating position of a filter pack refers to the position in which the filter pack is located during normal operation of the rotary filtration device.

The term "generally horizontal" when describing the orientation of a line or plane or member or element, for example, the longitudinal axis of the rotatable shaft, means that the line or plane or member or element is oriented with respect to the horizontal at an angle of less than 45°, usually 30° or less, desirably 20° or less, more desirably 15° or less, preferably 10° or less, more preferably 5° or less, and most preferably essentially zero degrees.

The term "generally vertical" when describing the orientation of a line or plane or member or element, for example, a filter, means that the line or plane or member or element is oriented with respect to the vertical at an angle of less than 45°, usually 30° or less, desirably 20° or less, more desirably 15° or less, preferably 10° or less, more preferably 5° or less, and most preferably essentially zero degrees.

If the filter surface facing and helping to define the fluid filtration gap is to have one or more spiral grooves, the filter should be rigid enough to hold the requisite spiral groove shape. In that case, rigid filter materials such as metal (e.g., sintered metal), ceramics, or glass might be suitable. Preferably, however, the filter itself does not contain any spiral or other groove(s), the disc surface helping to define the fluid filtration gap contains one or more spiral grooves, and the surface of the rotating member does not also constitute a filter surface.

The filter may be made of any material so long as the filter can perform the functions required in accordance with this invention and is otherwise chemically and physically suitable under its respective operating conditions. Accordingly, the filter may be polymeric, metallic, ceramic, or of glass, and may be of any form or shape. Thus, the filter may be formed of particles or of a film or of fibers or of a combination of all three. The filter may be woven or non-woven. Generally, non-woven metal filters have certain advantageous features as compared with polymeric filters: they are easier to sterilize; generally have superior chemical and heat resistance; may be cleaned more easily; and have significantly better structural integrity and rigidity. If two or more filters are used, they may be of the same or different material and filtration or sieving characteristics.

The filter used may be an asymmetric surface filter. An asymmetric surface filter is a filter whose two major faces have different distributions of pore sizes such that the average or median pore size on one face is significantly smaller than the average or median pore size on the other face. Desirably, the asymmetric surface filter is oriented in a device of this invention with the face having the smaller average or median pore size facing the fluid filtration gap and the face with the larger average or median pore size facing away from the gap. A preferred metal filter of this type is the DYNALLOY fiber metal filter marketed by Fluid Dynamics of DeLand, Fla. The use of a metal filter may be advantageous if one or more electric fields are also being used in the device or if the filter is to carry a charge.

One or more electric fields may be applied in axial, or radial, or non-radial non-axial directions. The fields may be useful in aiding separation and can be applied using known technology. In this context "axial" means along or parallel to the axis of rotation of a rotating member (disc or filter) and "radial" means along or parallel to a radius of the plane of a disc or filter. The field may be the result of direct or alternating voltage, e.g., a high frequency alternating potential. One or more fields in different directions may be applied, which together will result in a single imposed field. One or more fields may be varied as a function of time, e.g., one radial field and one axial field in interleaved on/off synchronization. Thus, the term "an electric field" as used in the claims and the specification should be understood to include all of the foregoing.

The key function of a filter is to freely pass the permeate and not pass the retentate. To do that efficiently, the permeate should adequately "wet" the filter. If the fluid has a high free energy (e.g., high surface tension), a surface that has a sufficiently high surface free energy will be wet by that fluid more readily than will a surface with a low surface free energy. Similarly, a low energy level fluid (e.g., an oil) will wet a low energy level surface more readily than it will wet a high energy level surface. As a general rule, the closer the energy levels of a fluid and a surface are to each other, the more readily that fluid will wet that surface.

Because water is a high energy liquid, principally because of hydrogen bonding, and because water is often a permeate in filtration processes, filters whose surface energy has been increased to increase their hydrophilicity may be used. Filters having a high surface energy are preferred, for example those of regenerated cellulose and those in accordance with U.S. Pat. No. 4,906,379. Filters in accordance with that patent are marketed under the trademark ULTRAFILIC by Membrex, Inc., the assignee of this application, and are most preferred. Such high energy filter surfaces have a reduced tendency to become fouled by materials having low energy properties, such as proteins and other organic substances.

Broadly speaking, a drop of water on such a high energy filter surface will form a contact angle of about 30° or less (see U.S. Pat. No. 4,906,379). A device of this invention using a filter that allows water to pass (permeate) but rejects oil will find particular use in separating water from oil, e.g., in cleaning up oil spills. Alternatively, a filter that is relatively hydrophobic (low surface energy) and allows oil to pass and rejects water may be used. Other especially advantageous combinations of the device of this invention and filters having certain inherent properties (e.g., high rejection rate of certain materials but rapid and easy permeation of their co-components in the feed fluid) will be apparent to those skilled in the art. Use of such filters in combination with the device of this invention will provide advantages that may not be achievable without the combination.

The filter matrix, and particularly a polymeric filter matrix, may also have ligands attached to it for selective sorption applications (e.g., ion exchange/sorption, affinity sorption, and chelation). Suitable ligands include any ligand capable of attaching to the matrix or to a precursor or a derivative of the matrix.

Preferred ligands, preferred methods for attaching ligands to membrane filters, and preferred membrane filters are taught in U.S. Pat. No. 4,906,379. Other useful ligands and methods for attaching the ligands to the filter will be known to those skilled in the arts of affinity sorption, enzyme immobilization chelation, and the like. As used in the claims and the specification, the term "selective sorption ligands" includes all of the foregoing ligands.

The filter may have pores of any size or shape provided they are appropriate for the feed fluid and the permeate and can provide the separation desired. The filter may have a narrow or broad or other distribution of pore sizes and shapes and may be asymmetric and used as an asymmetric surface filter. The filter may have a relatively sharp molecular weight cut-off point.

Almost any fluid to be filtered can be filtered using a device of this invention, but it finds particular use in filtering feeds having high solids content, mixed phase fluids, and biological fluids. High solids content fluids may be, for example, biological fluids, fluids containing affinity particles, (e.g., selective sorption affinity particles), particles of ion exchange resin, catalyst particles, adsorbent particles, absorbent particles, and particles of inert carrier. The inert carrier particles may themselves carry catalyst, resin, reactants, treating agents (e.g., activated charcoal), etc. Mixed phase fluids include liquid/solid, liquid/liquid, and liquid/gas systems. The fluid may contain more than two phases. The liquid phases may all be aqueous or non-aqueous or may be one or more aqueous phases and one or more non-aqueous phases together. The phases may be immiscible, e.g., two aqueous phases that are immiscible because each phase has a different solute. The fluid may have gaseous, liquid, and solid phases. Reaction and/or heat transfer may accompany the filtration process of this invention and take place inside or outside a device of this invention.

Biological fluids are fluids that originate from or contain materials originating from biological organisms (e.g., from the animal or plant kingdoms) or components thereof, including living and non-living things (e.g., viruses). Thus, the term "biological fluids" includes blood; blood serum; plasma; spinal fluids; dairy fluids (e.g., milk and milk products); fluids containing hormones, blood cells, or genetically engineered materials; fluids from fermentation processes (including fermentation broths and reactant, intermediate, and product streams from beer-making and wine-making); fluids containing or consisting of microbial or viral material, vaccines, plant extracts, or vegetable or fruit juices (e.g., apple juice and orange juice); fluids containing microorganisms (e.g., bacteria, yeast, fungi, viruses); and so forth. The device is particularly useful with fluids containing pressure-sensitive or shear-sensitive components, e.g., cells (blood cells, mammalian hybridomas, etc.). It is useful for filtering fluids containing drugs and precursors and derivatives thereof. It is also useful for filtering organic compounds in general (including oils of all types, e.g., petroleum oil and food oil) as single or mixed phases (e.g., oil/water). It is also useful for filtering coatings and paints as well as fluids containing surfactants, emulsions, or liposomes.

A plurality of rotating members (e.g., rotating discs) and/or a plurality of filter packs may be used in a rotary filtration device of this invention. Thus, it is within the scope of the invention to have a single rotating member disposed between two filters packs, thereby defining two filtration gaps. In such a device, one or both of the two major surfaces of the rotating member would desirably each have at least one spiral groove. It is also within the scope of this invention for such a device to have several interleaved discs and filters, that is, rotating members and essentially stationary filter packs in alternating arrangement, so that several filtration gaps are defined. In that case, the rotating members could be mounted on a common shaft for rotation in unison and the permeate from the filter packs could flow to a common or to separate manifolds or headers for collection. In a device having a plurality of interleaved rotating members and stationary filters, each surface defining a fluid filtration gap may have one or more spiral grooves.

Rotation may be at a constant speed or at varying speeds and in a single direction or in alternating directions. If two or more members rotate, they may rotate in the same or different directions and at the same or different speeds. The rotating member(s) may periodically reverse its or their direction(s) of rotation (i.e., oscillate). Preferably the rotating member or members are rotated by a common shaft and only in a single direction of rotation.

The rotating member or members may also translate axially (reciprocate) approximately perpendicular to the plane of rotation. The rotating member(s) and/or filter(s) also may be vibrated to aid filtration.

In the filter pack, the filter lies adjacent the permeate collection member. Desirably, the surface of the permeate collection member has a network of collection pores, grooves, or passageways that carries the permeate that flows through the filter into the interior of the permeate collection member. Desirably, the permeate collection member has two major surfaces, which desirably are substantially parallel. Desirably, the permeate collection member has a third surface that is perpendicular to the two major surfaces. If both major surfaces of the permeate collection member carry filters, the pores, grooves, or passageways carrying permeate from the two filters may be fluidly connected inside the permeate collection member to provide a single permeate collection network.

The permeate may leave the permeate collection member of a filter pack through one, two, or more permeate connection means. Such means may be a simple port, a nozzle, or the like. The permeate connection means desirably is located in the third surface of the permeate collection member. The port may also have a gasket or other sealing means to fluidly seal the permeate pathway where the permeate connection means brings the permeate to the permeate collection header.

The design of the permeate collection member is not critical and any design may be used so long as the member can perform its functions in accordance with this invention. The permeate collection member may be made of any material that has the requisite properties, including mechanical strength, chemical resistance, and compatibility with the fluids being processed.

Each filter may be mounted on a filter support. Such a support is desirable, particularly if the filter does not itself have sufficient structural rigidity. Preferably the permeate collection member adjacent a filter also functions as the support for the filter if a support is needed; however, it is within the scope of the invention to have a separate filter support. In that case it desirably lies adjacent the permeate collection member and between the permeate collection member and the filter. Preferably, a network of permeate collection passageways is disposed in any filter support in fluid communication with the downstream side of the filter (facing away from the fluid filtration gap) and the network of passageways of the permeate collection member so that permeate passing through the filter flows through the filter support and into the permeate collection member.

Any method of mounting a filter on its separate filter support (if used) or on its permeate collection member may be used provided that method does not unduly hinder operation of the device. Preferably, the method of mounting the filter does not significantly reduce the active area of the filter but such reduction may be necessary in some cases. The periphery of the active filtration area of each filter should be sufficiently fluidly sealed to the surface of its adjacent permeate collection member or separate filter support (if used) so that permeate that passes through the filter does not mix with any fluid in the fluid filtration gap. For example, it is desirable that permeate not flow back out into the fluid filtration gap through a break in the seal around the edge of the active filtration area and that retentate not flow through such a break in the seal to mix with the permeate that has passed through the filter.

Feed fluid may be introduced into the fluid filtration gap continuously or in batches. Permeate may be removed continuously or in batches. Retentate may be removed continuously or in batches. Retentate containing one or more species concentrated from the feed fluid may be the desired product, e.g., for testing. The permeate product may be feed fluid from which particulate or other matter that would interfere with subsequent testing has been removed by the filtration device. Testing may be for the presence of or concentration of any chemical or biological species or for one or more physical or chemical properties (e.g., pH, temperature, viscosity, extent of reaction, specific gravity, chloride ion, antibodies, viruses and other microorganisms, sugars, ethanol). Thus, a device of this invention may further comprise means for physically and/or chemically testing the retentate and/or the permeate, e.g., for one or more of the foregoing species and/or properties (characteristics).

Desirably, the rotating member (e.g., disc) and its corresponding filter pack are mounted in a housing. The housing may be of any size or shape and of any material so long as the housing does not adversely affect performance of the device of this invention. Generally, the housing will be no larger than is reasonably required to house the rotating member(s) and the filter pack(s). A housing need not be used at all or the housing or a part of its bottom, top, and/or sides may be open and the device may be placed into a body of fluid (e.g., a lake, a fermentation tank) to produce a permeate and/or retentate product, e.g., for testing. The pumping action of the device can be used to move the feed fluid into the filtration gap from the body of feed fluid. Partial or complete immersion of the device allows fluid to flow into the fluid filtration gap.

A device of this invention may be used in many different ways, e.g., for monitoring a reaction (e.g., by testing, or for producing a testable fluid from, the reaction medium in a reactor or a reactor effluent stream), as an integral part of a reactor scheme (e.g., for separating catalyst from a reactor effluent stream for recycling to the reactor or for regeneration, or for continuously removing product and/or by-products and/or continuously replenishing nutrients in a cell culture reactor), or as part of a recovery scheme (e.g., for separating products, by-products, contaminants, etc. from a reaction or process stream). The device may be located in situ in any type of process vessel (e.g., reactor) or pipeline (e.g., reactor effluent piping or slip-stream piping) for any purpose (e.g., producing a testable fluid) where filtration needs to be performed continuously or intermittently.

Although there are no theoretical upper or lower limits on the diameter of the rotating member and stationary filter pack, because of the speed of rotation, which may vary anywhere from under 100 rpm to 1000 rpm or higher, and because of engineering, fabrication, and cost constraints, the rotating member(s) of the filtration device will rarely be more than one or two meters in diameter. Accordingly, to increase the capacity of a device of this invention beyond the capacity provided by rotating members and filter packs approximately one or two meters in diameter, it is preferred that the filtration capacity be increased by adding additional rotating members and/or filter packs as needed. Regardless of the rotating member and filter pack diameters, capacity can always be increased by adding more rotating members and filter packs to a single device or by connecting two or more devices in series or parallel. A plurality of rotating members and/or filter packs may be mounted in a common housing. Generally, a device according to this invention using a plurality of interleaved rotating members and filter packs requires a smaller equipment volume than a cylindrical rotary filtration device providing the same filtration area.

The rotating member may be made of any material and have any design or shape provided it has the requisite physical and chemical properties so that it can perform its function according to the present invention. The rotating member most preferably is disc-shaped.

Because the rotating member is rotated and because it is desirable that it not deform during the filtration process, the rotating member requires a certain minimum structural rigidity. Also, the rotating member preferably should be relatively inert chemically to the feed fluid. Generally, the rotating member will be made of metal although other materials such as ceramics, glass, and polymers may be used. Preferably, the surface of the rotating member facing the filtration gap, including the inner surface(s) of any grooves, is relatively smooth. Preferably, the surface of the filter, including one or more grooves (if used on the filter), is relatively smooth. A rough surface favors the onset of turbulent flow in the fluid in the filtration gap at lower rotation rates, which flow is energy inefficient and may adversely affect one or more components of the fluid being filtered.

Generally, the peripheries of the rotating member and of the filter and permeate collection member will be circular, although other shapes may be used. The center of the rotating member will generally coincide with the center of the filter and permeate collection member, and all three centers will usually lie on the axis of rotation of the rotating element(s). The peripheries of the rotating member and of the filter and permeate collection member will usually be approximately the same radial distance from the axis of rotation. It is possible, but less desirable, to have more than one rotating member facing a single filter to define a plurality of filtration gaps on the same side of the filter or to have more than one filter facing a single rotating member to define a plurality of filtration gaps. Usually, however, one rotating member will face a single filter and the peripheries of each will be approximately the same distance from the axis of rotation.

Preferably, the surface of the filter is substantially planar. Depending on the type of filter and its surface, the surface may have microconcavities and microconvexities; however, their presence is not inconsistent with the filter surface being considered to be substantially planar. Furthermore, if the filter surface contains one or more grooves and even if those grooves occupy almost the entire filter surface and have depths of 5 millimeters or more, that will still not prevent the filter surface from being considered to be substantially planar.

Similarly, the surface of the rotating member helping to define the fluid filtration gap is preferably also substantially planar, and the presence of micro and macro concavities and convexities (including, e.g., grooves with depths of 5 to 10 mm or more) will still not prevent the surface of the rotating member from being considered to be substantially planar.

Although the rotating member and filter surfaces are preferably planar (e.g., for ease of fabrication), they need not be planar. For example, either or both may have axial cross-sections that are conical, trapezoidal, or curved. In fact, any shape may be used provided the benefits and functioning of this invention can still be achieved. Thus, if the filter pack is to be readily moved into and out of its normal operating position within the filtration device by moving it in a direction that is perpendicular to the longitudinal axis of the shaft, it is desirable that the rotating member not lie in the path of such movement. Because the width of the fluid filtration gap may vary, the two surfaces defining the gap may, for example, be closer to each other at their centers or at their peripheries. If both surfaces have the same cross-sectional size and shape, they may be oriented so that the gap width is constant, provided, however, that the position of the rotating member not interfere with the rapid and easy insertion and removal of the filter pack.

It is preferred that neither the rotating member nor the filter have any significant non-spiral protuberances (e.g., non-spiral blades or vanes) extending into the fluid filtration gap because their presence will tend to adversely affect, for example, energy efficiency.

Preferably, the surfaces of the rotating member and filter defining the fluid filtration gap will be substantially parallel, that is, the planes of the two surfaces will not be at an angle to each other exceeding approximately 30°, desirably 20°, more desirably 15°, preferably 10°, and most preferably will not be at an angle to each other exceeding 5°. Larger angles tend to reduce the benefits of the present invention, particularly where the device has more than one rotating element. Even if a member (rotating member or filter) is, strictly speaking, non-planar (e.g., dished), the member still will be considered to have a major plane of its general orientation, and it is that plane which should be used in determining whether the planes are substantially parallel A device according to this invention may be oriented horizontally, vertically, or diagonally, that is, the axis of rotation of the rotating member (i.e., the longitudinal axis of the rotatable shaft) may be horizontal, vertical, or diagonal. In a vertically oriented device having one rotating member and one filter, the rotating member may be above the filter or the filter may be above the rotating member. Regardless of the number of rotating members and filter packs and the orientation of the device, it is desirable that the fluid filtration gap be kept filled with fluid during filtration.

Rotation of the rotating member(s) may be achieved using any direct or indirect means, for example, an electric motor, a motor coupled via pulleys and drive belt or by gear transmission, or a magnetic drive. Axial translation of the rotating member(s) or filter(s) and vibratory movement may be accomplished using known technology, although axial translation of the filter(s) is not preferred.

The control system for the filtration device may provide for continuous or batch addition or withdrawal of feed fluid and/or permeate and/or retentate. The design of the peripheral equipment used with the filtration device is not critical. Off-the-shelf technology may be used for the addition, collection, and withdrawal of fluid, for the control system, the rotary drive means, etc. The design and selection of all of this peripheral equipment is within the skill of the art.

Generally, the operating pressure and transmembrane pressure in the device can be any values that do not interfere with the filtration process or adversely affect the feed or product fluids. (Although the filter need not be a membrane, the term "transmembrane pressure" is used because it is a common term.) Thus, a transmembrane pressure only slightly above atmospheric pressure may be used or the transmembrane pressure may be substantially higher. Generally, lower transmembrane pressures are preferred because they tend to minimize solids build-up on the surface of and within the filter. Also, lower operating pressures are generally preferred because they tend to make the equipment less costly. However, in some cases it may be desirable to use higher operating pressures to aid filtration. For instance, when processing carbonated beverages, the operating pressure must be kept sufficiently high to prevent degassing. It may also be desirable to use other forces, for example, electromotive force, to aid filtration in certain cases.

Desirably one or more spiral grooves are used on one or more of the surfaces defining the fluid filtration gap. A groove is a long narrow channel or depression. It may also be thought of as an elongate concavity or depression whose length lies in a plane parallel to the surface in which the groove is located. The term "spiral" may be defined in many ways but one simple definition is that a spiral is the path of a point in a plane moving around a central point in the plane while continuously receding from or advancing toward the central point. Details concerning the spirals are set forth in U.S. patent application Ser. No. 708,069, filed May 30, 1991, now U.S. Pat. No. 5,143,630. Of course, flat surfaces and surfaces with configurations o than spiral grooves can be used, but spiral grooves are preferred.

With a rotary disc filter having a stationary flat filter and a closely spaced substantially parallel rotating flat disc (i.e., a disc without grooves, etc.), it is known that the fluid shear is a function of radial position, increasing from a relatively low value at the center to a relatively higher value at the circumference of the disc. Although the entire flat disc rotates as a unit, the tangential linear velocity is essentially zero at the precise center of the disc and is at its maximum at the circumference of the disc. Thus, one would expect the greatest cleaning action or shear caused by rotation of the disc to occur at the annular ring of the filter opposite or corresponding to the circumference of the disc. The fact that with a flat disc the cleaning action or shear at the filter surface varies so widely and depends upon the distance from the center of the filter is a significant disadvantage of using a rotary disc filtration device in which the filtration gap is defined by the filter and by an oppositely disposed flat rotating disc. As shown in the examples of U.S. patent application Ser. No. 708,069, filed May 30, 1991, now U.S. Pat. No. 5,143,639, that is in sharp contrast to the superior performance that is o when a device having spiral grooves is used, and that is why spiral grooves are preferred.

The separation between the two surfaces defining the filtration gap and the speed of rotation also affect the cleaning action or shear and, hence, the flux. The cleaning action, generally speaking, is inversely related to the gap width. The effect of varying the gap, at least within a certain range, has a measurable but relatively small effect on flux, that is, the relationship between gap width and wall shear (i.e., shear rate at the membrane surface) is not strong. In any case, at some point, the filtration surface and its oppositely disposed disc will be too far apart for rotation of at least one of the members to have any beneficial effect on flux. On the other hand, because of engineering tolerances, among other things, at some point the two surfaces defining the filtration gap will be too close together to allow rotation of the rotating member. Accordingly, there is a useful working range of gap widths for any particular filtration device for a given feed fluid. The two oppositely disposed surfaces defining the fluid filtration gap should be closely spaced and thus the gap width will usually be within the range of 1 to 100 millimeters, often 1 to 50 millimeters, desirably 1 to 25 millimeters, preferably 1 to 15 millimeters, and most preferably 1 to 10 millimeters. Spacings outside the range of 1 to 100 millimeters may be used if the other parameters can be adjusted so that the benefits of this invention are obtained. The gap width for a given device may vary, e.g., in the case where the rotating member(s) and/or filter(s) are not planar (for example, two conical surfaces that point towards or away from each other). In other words, the fluid filtration gap can vary radially. Such variation may be useful to help maintain constant average shear stress as feed viscosity increases as a result of concentrating one or more species (e.g., as in dewatering).

The speed of rotation affects the flux: higher rotation rates increase the cleaning action and lower rotation rates decrease the cleaning action. Any speed of rotation may be used that is consistent with the design of the equipment and the shear-sensitivity of the fluid being processed. The speed will usually be from 50 to 2000 rpm. Values outside the range of 50 to 2000 rpm may be used provided the benefits of this invention can still be achieved.

Turning now to the drawings, in FIG. 1 rotary filtration device 20 comprises housing 22 and two entry means (doors) 24 and 26 that are hingedly attached by hinges 38. Door 24 is rotated closed and then locked shut after the filter packs (not shown) have been inserted into their normal operating positions in the device. Locking is accomplished by means of the cooperation of notches 40 and locking means 42. Door 26 is shown in the closed and locked position. Rotation means (motor) 28 is connected to rotatable shaft 30 (not shown), which shaft is within outer housing 36. Rotating circular members (discs) 32, which have spiral grooves 34, are fixedly attached to the shaft for rotation. During normal operation, plenum 44 (the internal space inside housing 22) will be filled with feed fluid for filtration. In FIG. 1, door 24 is open to allow filter packs singly or a structurally connected group of them in a cartridge to be inserted into normal operating position in the device, after which the door will be closed and locked to maintain the filter packs in place.

Figure 2:
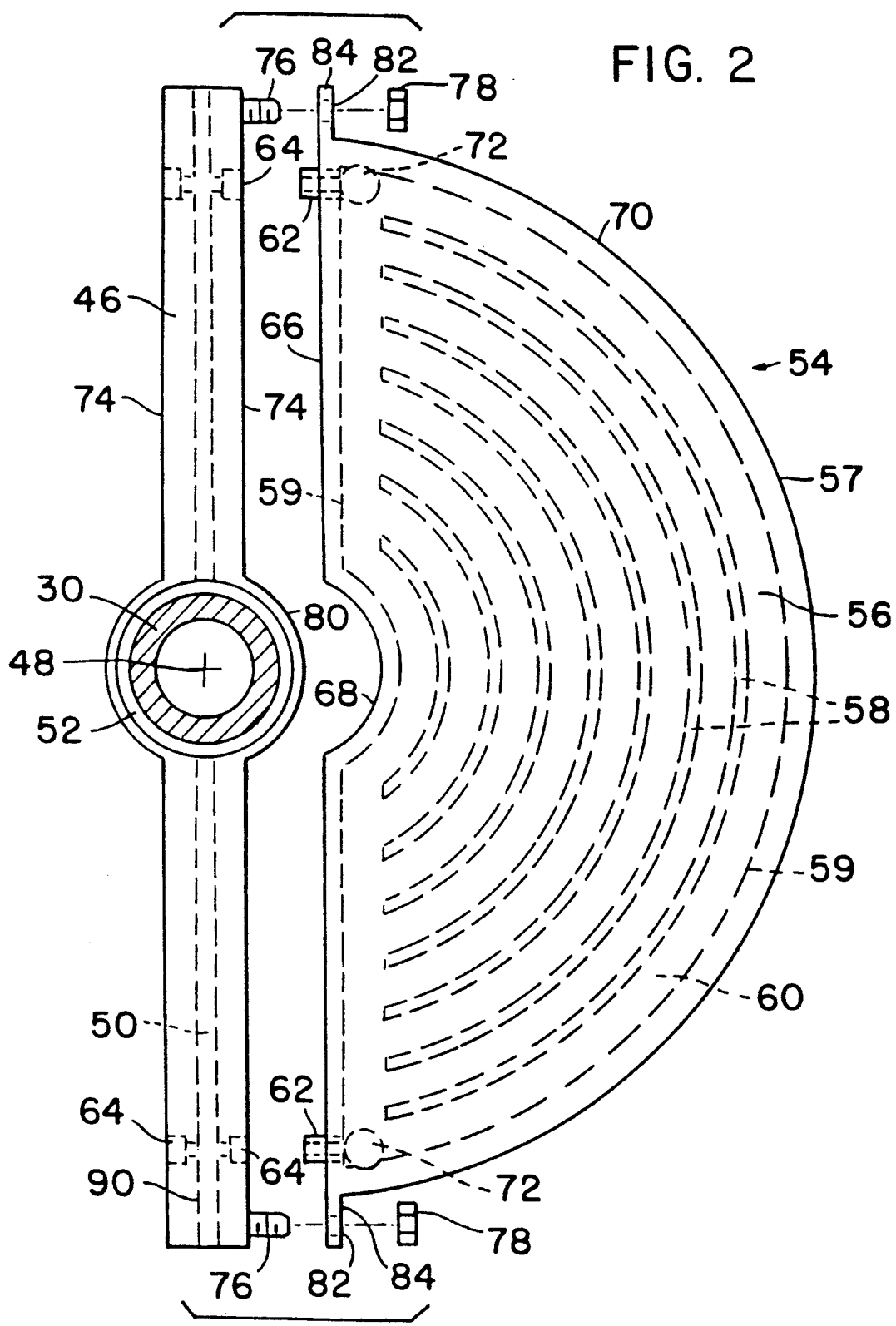
FIG. 2 is a plan view of a filter pack of this invention shown spaced apart from its feed fluid/permeate collection header.

FIG. 2 is a plan view showing filter pack 54 before it has been moved in a direction perpendicular to longitudinal axis 48 of shaft 30 to abut feed fluid/permeate collection header 46 and be mounted thereon. Filter pack 54, which is D-shaped in plan view and which has two D-shaped parallel major faces, comprises first filter 56 (and second filter 94; see FIG. 4) mounted on permeate collection member 57. Filter pack 54 has outer periphery 70, which is generally D-shaped, and inwardly facing rounded cutout 68 in planar surface 66, which surface abuts planar surface 74 of header 46 when the filter pack has been mounted for use. Cutout 68 corresponds to and mates with rounded convex section 80 of header 46 when filter pack 54 is in its normal operating position. A second D-shaped filter pack (not shown) may be mounted on the left side of the header ("left" refers to the left side of FIG. 2 when oriented for normal viewing).

Figure 3:
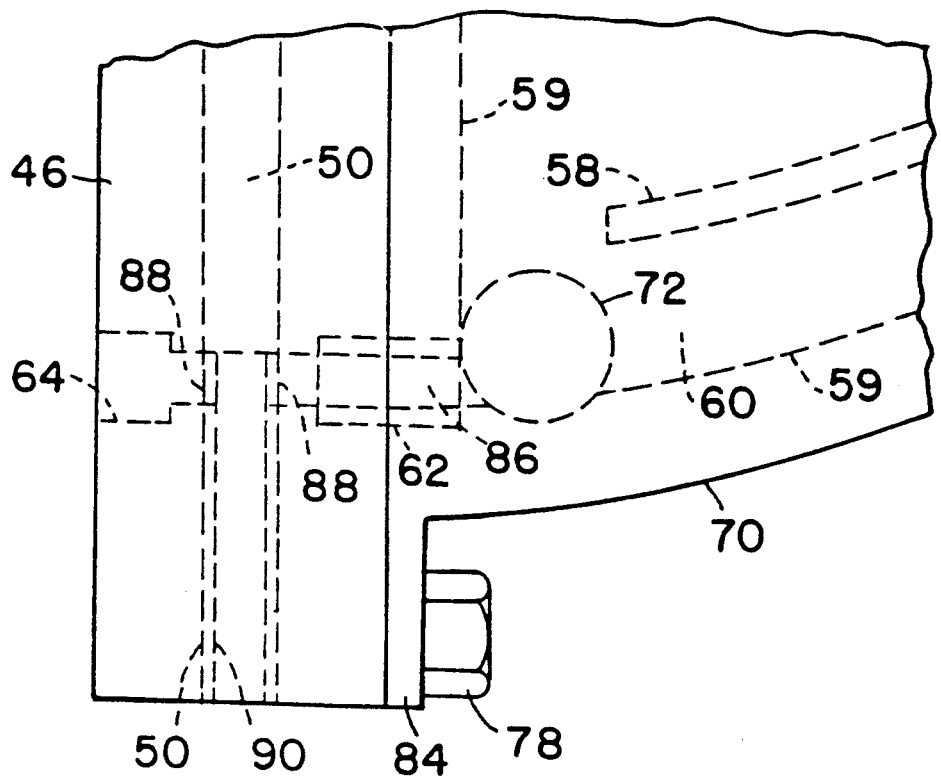
FIG. 3 is an enlarged detail view of the filter pack mechanically and fluidly attached to the feed fluid/permeate collection header.
Figure 4:
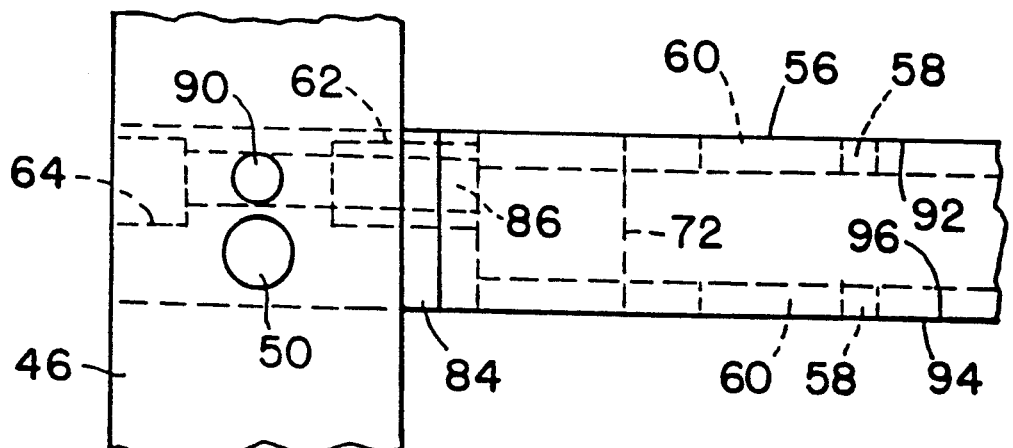
FIG. 4 is an end view of the configuration of FIG. 3.

Referring to FIGS. 2, 3, and 4, filter pack 54 has mounting lugs or ears 84 having openings or holes 82 through which mounting bolts 76 fit when filter pack 54 has been brought sufficiently close to header 46. Nuts 78 screw onto bolts 76 to fixedly attach the filter pack to the header. Header 46 extends vertically in the device, and thus shaft 30, its longitudinal axis 48, and annular feed fluid delivery conduit 52 also extend vertically in the device, i.e., the rotary filtration device is vertically oriented. There are gaps or holes in conduit 52 along its length at appropriate points to allow feed fluid to flow out of the conduit near rounded cutout 68 and into the space between each rotating member and its adjacent filter pack.

A plurality of filter packs may be attached along the vertical length of the header and, as noted above, on both sides of the header. Thus, those filter packs on both sides of the header at the same vertical height on the header would, when viewed from the top, form a complete circle around the shaft, the center of which circle would be the longitudinal axis of the shaft. The plurality of filter packs along the length of the header would appear to be stacked one above the other with discs interleaved in an alternating sequence with filter packs. The D-shaped filter packs may also be used in a device in which the shaft's longitudinal axis is not vertical.

Filters 56 and 94 lie on the two opposing major faces of permeate collection member 57. Each filter is supported in part by semi-circular ribs 58, which are elevated above the bottom surface of recess or depression 60 in the D-shaped major surface of permeate collection member 57. The outer expanse of recess 60 is indicated by dotted line 59, which itself is generally D-shaped. The narrow portion of the first major surface that lies between periphery 70 of the filter pack and the outer extent of recess 60 (indicated by dotted line 59) supports the outer edge of the filter. Additionally, that outer D-shaped edge of the filter is sealed to that narrow peripheral portion of the first major surface to isolate fluid that has passed through the filter into the permeate collection member from fluid that has not passed through the filter (i.e., fluid in the fluid filtration gap).

First filter 56 lies adjacent first major surface 92 and second filter 94 lies adjacent second major surface 96. Permeate (or filtrate) that passes through filter 56 collects in recess 60 and flows towards either of the two permeate drains 72. In filter pack 54 shown in FIGS. 2 to 4, supporting ribs 58 are semi-circular elevations on each of the two parallel major surfaces of permeate collection member 57; however, ribs 58 could also be straight or have any other shape or configuration that allows the network of ribs to perform its intended function, including supporting the filter and allowing rapid and easy passage of permeate from the downstream (bottom) side of each filter through drains 72.

Permeate flows from recess 60 through either drain hole 72, where the permeate makes a 90 degree turn and then flows through passageway 86 of permeate connection means (nozzle) 62. Permeate from the two opposing D-shaped filter packs (only one of which is shown) meets in passageway 88, which connects the two opposing cavities 64. Each nozzle 62 fits tightly into its respective mating cavity 64 to provide a fluid-tight seal. Holes 82 in mounting ears 84, mounting bolts 76, nozzles 62, and cavities 64 are arranged so that as filter pack 54 is inserted into its normal operating position between two rotatable discs, the fluid flowpaths formed by the two nozzles 62 and the two respective mating cavities 64 (only one pair of which is shown) are automatically completed. That is, as the filter pack is pushed onto its two mounting bolts, the two nozzles are at the same time pushed into the two respective holes for them in the permeate collection header. The permeate that flows into passageway 88, which connects the two opposing cavities 64, makes a 90 degree turn and flows into short permeate conduit 90, which in turn is fluidly connected to the rest of the permeate collection/drainage system of the device (not shown).

Figure 5:
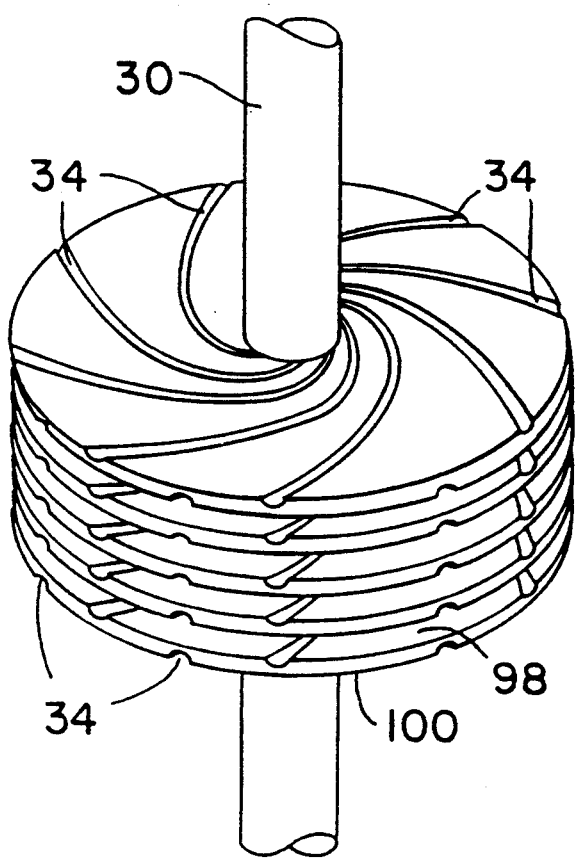
FIG. 5 is a perspective view of a plurality of rotating members (discs) mounted on their rotatable shaft.

FIG. 5 shows five circular discs on drive shaft 30. Each disc has first major face 98 and second major face 100, which faces are oppositely disposed and parallel. Each disc face has eight spiral grooves 34.

Figure 6:
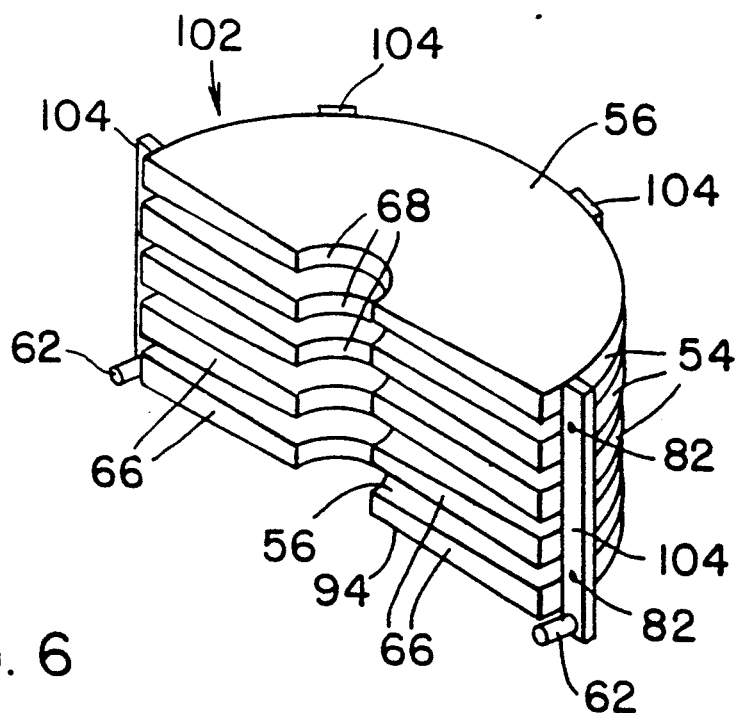
FIG. 6 is a perspective view of a cartridge of this invention, comprising a plurality of filter packs.

FIG. 6 shows cartridge 102 of this invention, comprising five filter packs 54 having first filters 56, surfaces 66, and cutouts 68. The filter packs are structurally joined together by four support members 104, the two of which closest to surface 66 have holes 82 to accommodate their respective mounting bolts. In this cartridge, the five filter packs are also fluidly connected to each other by two permeate collection manifolds, which are inside the two structural members 104 carrying mounting holes 82. Permeate collected inside each manifold flows out through nozzle 62.

Use of cartridge 102 facilitates insertion and removal of the filter packs, because the filter packs do not have to be handled individually. Instead, the cartridge is inserted or removed from the rotary filtration device as a unit, thereby speeding such operations. The fluid connections for draining permeate from the filter packs/cartridges are made automatically as the cartridge is moved into its normal operating position in the device.

Because the plurality of rotatable members (discs) are fixedly mounted on the shaft and the cartridge is being moved into or out of device that already has the discs and shaft in normal operating position, the cartridge must be oriented for such movement with the filter packs interleaved in alternating arrangement with the discs, and the movement must be in a direction that is generally perpendicular to the longitudinal axis of the shaft. It is a feature of this invention that the discs and shaft do not have to be moved out of their normal operating positions to allow a filter pack or cartridge to be inserted into or removed from its normal operating position in the device.

Figure 7:
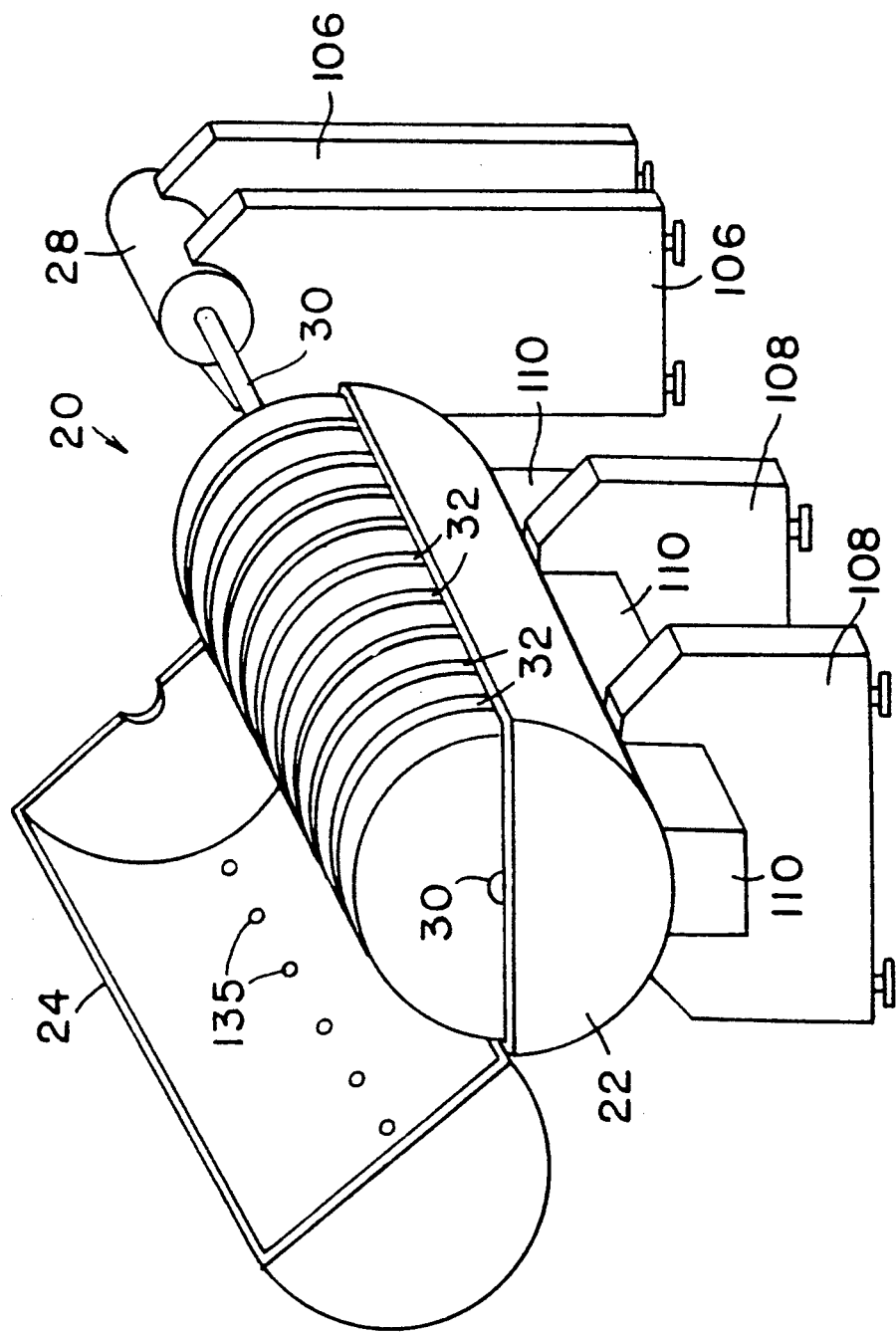
FIG. 7 is a perspective view of another rotary filtration device of this invention.

FIG. 7 is a perspective view of a preferred embodiment of this invention. Rotary filtration device 20 is horizontal, that is, the longitudinal axis of shaft 30 is horizontal. Door 24 is open so that filter packs can be inserted into their normal operating position in the device. Discs 32 are rotated by shaft 30, which is driven by motor 28. Housing 22 rests on supports 108, and motor 28 rests on supports 106. Cover 110 protects the fluid piping (described below).

Figure 8:
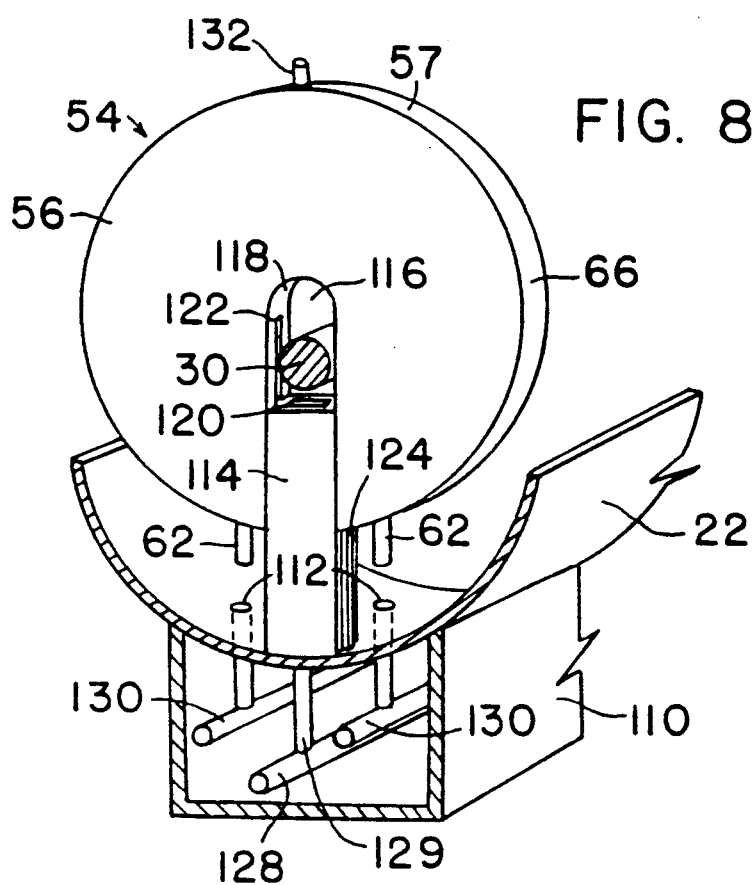
FIG. 8 is a perspective view showing a filter pack of this invention in the process of being inserted into the rotary filtration device of FIG. 7.
Figure 9:
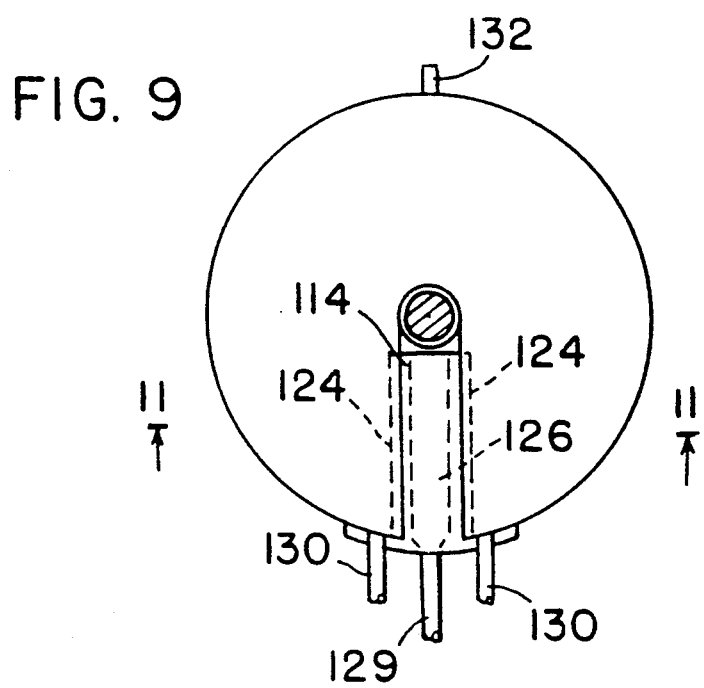
FIG. 9 is an end view showing the filter pack of FIG. 8 after it has been fully inserted into its normal operating position in the device.

FIG. 8 shows filter pack 54 being inserted into its normal operating position by moving it down, around vertical element or tongue 114, which is fixedly attached to housing 22, and FIG. 9 shows the filter pack after insertion is complete. Filter pack 54 has two major oppositely disposed parallel faces, each of which carries and has adjacent to it a filter (only one of which, filter 56, is shown). Radial cutout 116 extends from surface 66 of permeate collection member 57 to just beyond the center, thereby defining internal side surface 118, which comprises two generally parallel planar portions that are joined by a curved portion near the center.

The purpose of the radial cutout is to provide clearance for shaft 30 as filter pack 54 is inserted. Because the longitudinal axis of the shaft will lie at the radial center of the filter pack and because the shaft has a diameter greater than zero, the radial cutout must extend from the periphery towards the center and go beyond the center by at least half the diameter of the shaft. In practice, the cutout will extend slightly beyond that to provide clearance between the inner curved portion of the cutout and the circumference of the shaft.

In this embodiment, filter pack 54 has an internal configuration for collecting permeate that may be the same or different from the internal configuration of the filter pack of the embodiment of FIGS. 2-4. Permeate is discharged through nozzles 62, which fit through holes 112 in the bottom of housing 22 to fluidly connect to permeate collection headers or piping 130. Depending on the porting arrangement of the manifold block, permeate from each filter pack may be collected separately, i.e., individually, or collectively, as shown.

Feed fluid is brought into the housing by piping or manifold 128. Feed fluid passes up through riser 129, which is part of the manifold, and into passageway 126, from which the feed fluid exit through opening 120 next to shaft 30. Feed fluid could alternatively be discharged through one or more openings near the shaft in either of the two longer faces of tongue 114. In the embodiment of FIGS. 2-4, feed fluid is delivered to the fluid filtration gap by the same element that helps remove permeate, namely, feed fluid/permeate removal header 46. In the embodiment of FIGS. 8-11, two separate fluid systems are used. Feed fluid is fed via piping 128, 129 into passageway 126 and out opening 120; permeate is removed from the filter pack via nozzles 62 and passes into piping 130.

Figure 11:
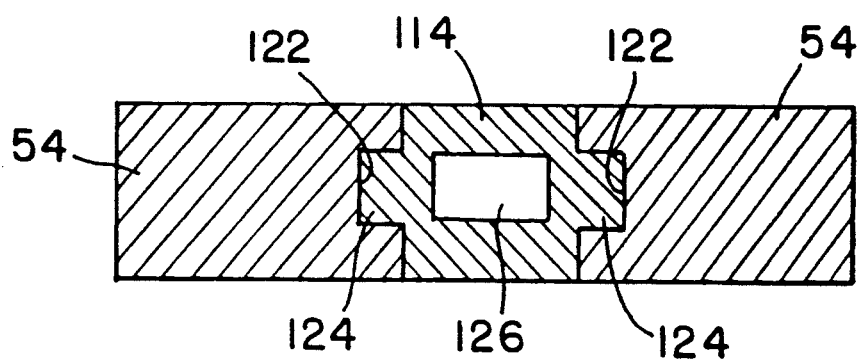
FIG. 11 is a sectional view taken along line 11—11 of FIG. 9.

Filter pack 54 is held in its normal operating position in part by the interaction of tenons 124 (raised elongate members) and mortises 122 (elongate grooves) into which the tenons fit. As best seen in FIG. 8, as filter pack 54 is pushed down, tenons 124 (only one of which is shown) mate with and slide in mortises 122 (only one of which is shown). Once the filter pack is in its normal operating position, the mortise and tenon joints are hidden from view, and they prevent the filter pack from rotating with respect to tongue 114 or from being displaced axially from it. The joints allow the fully inserted filter pack to be moved in only one direction, namely, in an upward direction to remove it from the device. The cross-sectional view of FIG. 11 shows the two mortise and tenon joints.

Figure 10:
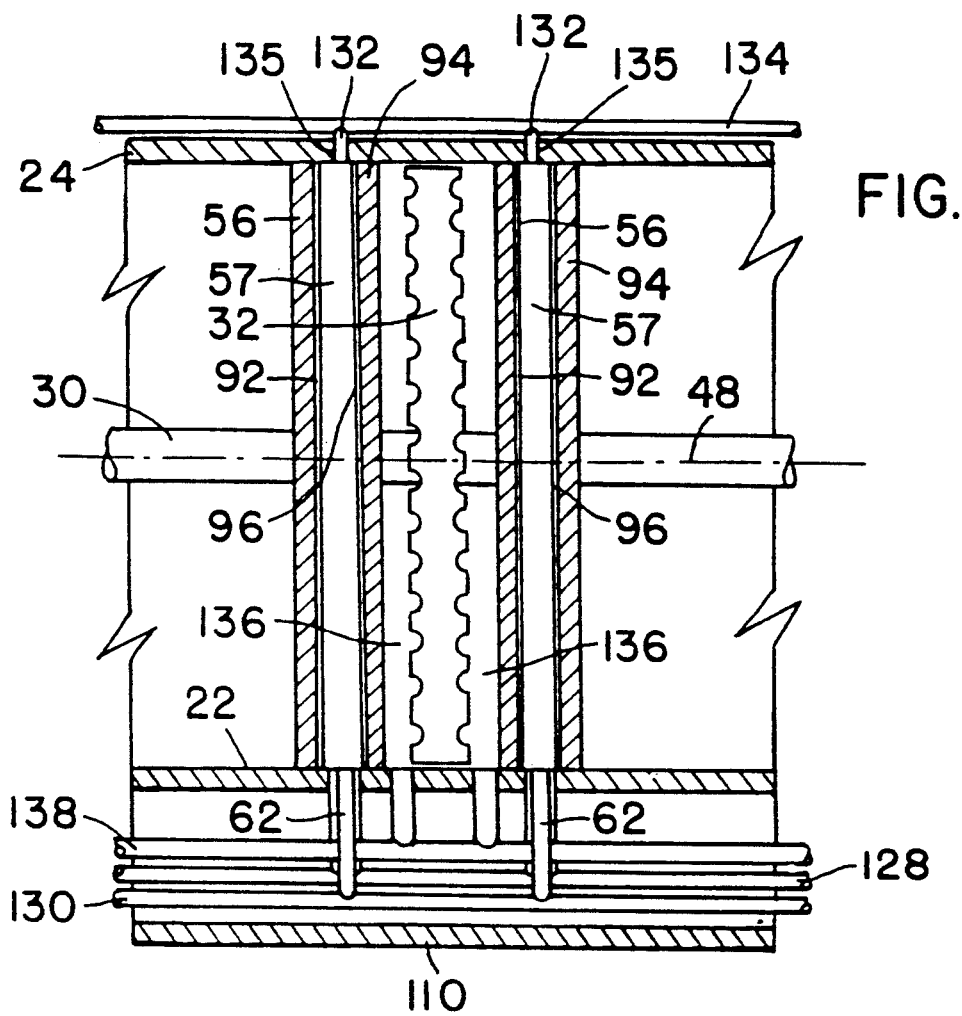
FIG. 10 is a partial elevational view of the rotary filtration device of FIG. 7, showing one of the rotating members (i.e., a disc) mounted on its shaft between two filter packs of this invention to define two fluid filtration gaps.

FIG. 10 is a partial view of the device, showing one disc 32 between two closely spaced filter packs 54 to form two fluid filtration gaps 136. Retentate flows downward in each gap and is removed through retentate header 138, which is fluidly connected to the bottom of each fluid filtration gap. Each filter pack has first and second parallel spaced apart filters 56 and 94 mounted on first and second parallel spaced apart major faces 92 and 96 of permeate filtration member 57. In this view, cover 24 (see also FIG. 7) has been closed and its inner surface abuts the upper end of each filter pack to bias the filter pac downward, to help maintain the filter pack in its normal operating position and to help maintain the fluid seal of nozzles 62 in permeate collection headers 130.

When first placed in the device, each filter pack will normally contain air. Thus, when permeate tries to enter the filter pack during normal filtration operation, the air inside the permeate collection member may hinder operation. Accordingly, gas removal nozzle 132 (see FIGS. 8, 9, and 10) is provided at the high point or upper end of each permeate collection member to allow gas to be removed and prevent the device from being "air bound." As best seen in FIG. 10, when device cover 24 is closed, nozzles 132 fit through openings 135 in the in the cover (see FIG. 7) into gas removal header or piping system 134. Thus, gas (air) may be removed, for example, under vacuum, from the filter packs to facilitate their operation and increase their efficiency. Nozzles to permit gas removal may also be used in D-shaped filter packs.

In the embodiment of FIGS. 7-11, the tongue portion of the manifold system (reference numeral 114; see FIGS. 8 and 9) delivers feed to the rotor drive shaft and supports the essentially circular filter packs. In the embodiment of FIGS. 1-6, the D-shaped filter packs are supported in the filtration device by being attached to header 46 (see FIG. 2). However, in those embodiments the use of the tongue or the header results in some loss in cross-sectional membrane filtration area. In the preferred embodiment of FIGS. 12-14, both the tongue and the header have been modified to allow maximization of the filter area in contact with fluid in the fluid filtration gap.

Figure 12:
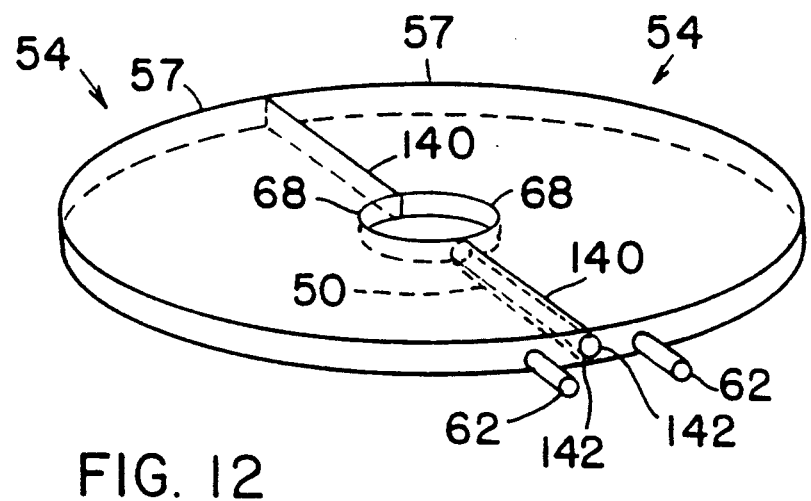
FIG. 12 is a perspective view of two filter packs of a preferred design joined together.
Figure 13:
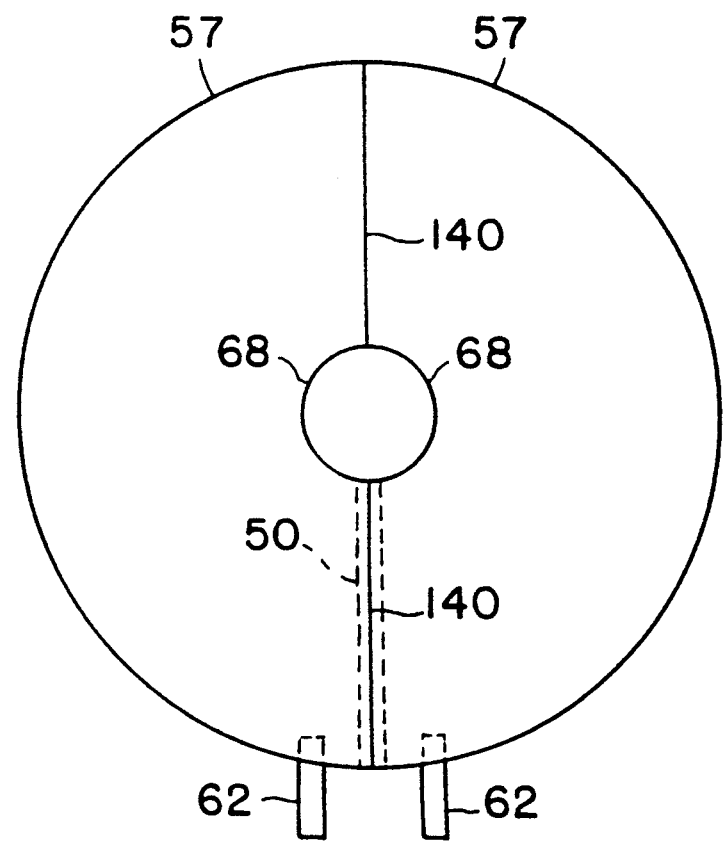
FIG. 13 is a top view of the embodiment of FIG. 12.
Figure 14:
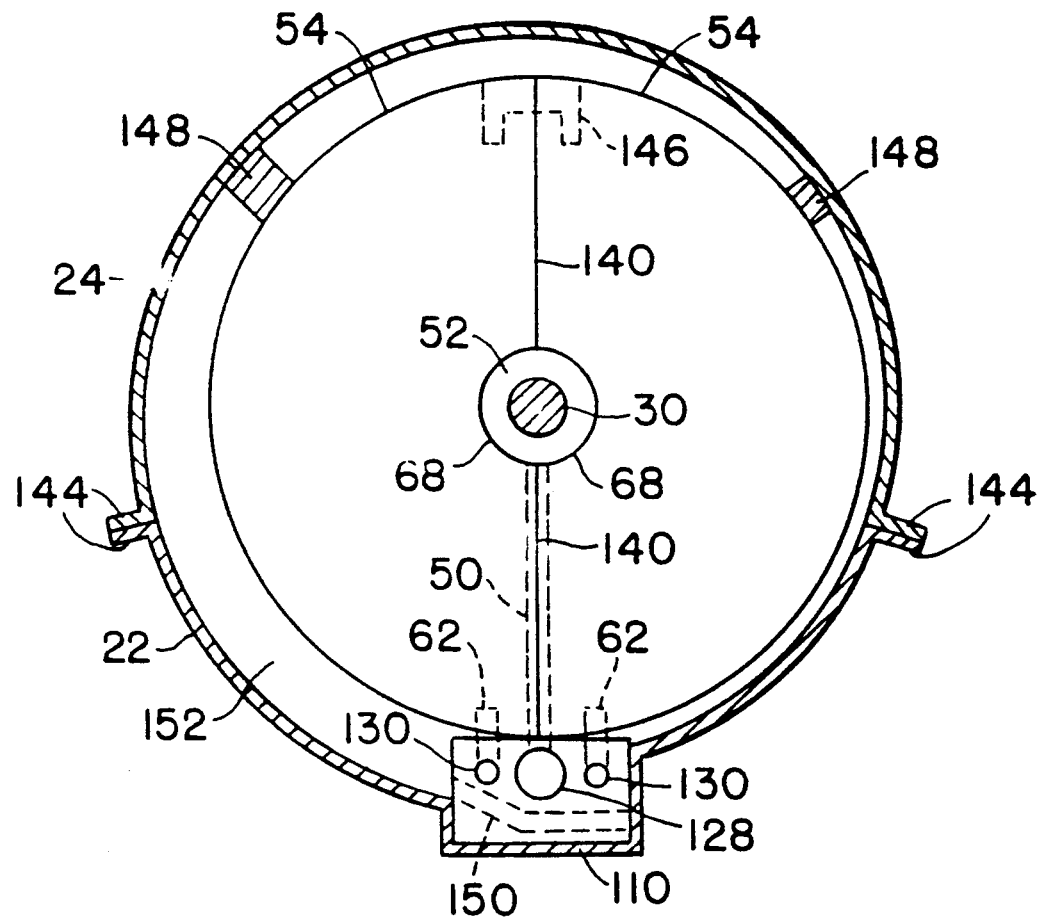
FIG. 14 is an end cross-sectional elevational view of a filtration device of this invention showing the preferred filter pack configuration FIGS. 12 and 13 in their normal operating positions in the device.

In FIGS. 12-14, two mirror image filter packs 54 are shown joined together to form an essentially circular filter pack configuration. Each of the two permeate collection members 57 has straight portion 140, which straight portions are adjacent each other to form a line of abutment although it is not necessary that the straight portions actually touch one another along any part of their length. (If the device with the filter packs in place must be sterilizable, it is preferable that the two filter packs not touch each other.) Each straight portion has a centrally located circular cutout 68 to provide clearance for the rotating shaft, which two cutouts together form annular feed space 52 for feeding feed fluid to each fluid filtration gap near the shaft. Each filter pack 54 has nozzle 62, which is located at the bottom of the filter pack when the filter pack is in its normal operating position in the device.

Short pipe or nipple 146 fluidly connects the permeate collection networks of the two permeate collection members together. Nipple 146, which is held by friction in two corresponding recesses in the upper part of the straight portion of each filter pack, mechanically locks the two filter packs together to help hold them in their normal operating positions in the device and prevent movement of one filter pack with respect to the other.

The bottom half of each of the two straight portions 140 has longitudinal recess 142, which is semi-circular in cross-section. When the two filter packs are joined together by nipple 146 and are in their normal operating positions in the device, the two mirror-image curved recesses, which extend from the outer circular periphery of the two joined filter packs to the centrally located cutout, form feed fluid conduit 50. The thus-formed feed fluid conduit conducts feed fluid from feed fluid header 128 to annular feed space 52 between shaft 30 and cutout 68. At the same time, the permeate connection means 62 of the two filter packs are fluidly connected to permeate discharge headers 130 and feed fluid conduit 50 is fluidly connected to feed header 128. As noted above, the two filter packs need not have their straight portions actually touching one another. If they do not, the space between them along the feed fluid conduit can be kept sufficiently narrow so that most of the feed fluid is conducted through the conduit to space 52 around the shaft. By using such a space between the filter packs, a portion of the feed fluid will be allowed to flow out from between them. Thus, the space between the filter packs near the feed fluid conduit may be adjusted to control the ratio of feed fluid flowing through the conduit to that exiting through the space between the filter packs.

To insert the filter packs so that they are in their normal operating positions shown in FIG. 14, cover 24 is removed, the two filter packs are inserted one at a time so that shaft 52 fits into the clearance provided by cutouts 68, and the filter packs are pushed down to complete the various fluid connections (e.g., connecting feed fluid header 128 to feed fluid conduit 140). Nipple 146, which is roughly U-shaped and has fluid openings for the permeate at the ends of its two legs, is then pushed into place in the circumferential outer wall of the two filter packs to fluidly connect their permeate collection networks and to mechanically lock the two filter packs together. The rotatable discs and shaft need not be moved at all to install the filter packs. Cover 24 is then positioned and attached to the bottom of the housing by means of connecting means (e.g., bolts and nuts; not shown) through flanges 144. The stabilizing blocks, the lower ends of which may fit into mating recesses in the outer peripheral wall of the filter packs, bias the filter packs downward to insure the fluid connections and to help keep the filter packs in their normal operating positions.

In the horizontally oriented device of FIG. 14 (i.e., the longitudinal axis of the shaft is horizontal), the discs rotate in a counter-clockwise direction. Because of this, retentate tends to be pumped in a counter-clockwise direction. The increasingly wide internal clearance between the inside of the housing wall and the periphery of the discs and filter packs and the location of the retentate discharge header allows the retentate to be swept out of the device more easily through retentate discharge 150. This is particularly advantageous when the retentate is more viscous and/or has a high solids content.

In this device, gas in the filter packs may be removed before filtration begins by forcing a liquid through one permeate discharge nozzle 62 in a filter pack pair. The fluid will then flow through nipple 146 and out of the other nozzle 62. A high enough liquid velocity will tend to sweep gas out of the pair. With this scheme, it is also desirable that nipple 146 be located as close to the top of the pair as possible because that is where the trapped gas will tend to collect. A similar scheme can be used to remove entrapped gas from the filter packs of FIGS. 7-11 instead of using gas removal nozzles 132 and gas removal header 134 (see FIGS. 8-10).

Variations and modifications will be apparent to those skilled in the art and the claims are intended to cover all variations and modifications that fall within the true spirit and scope of the invention. For example, the permeate collection system may be designed so that permeate from one or more of the filter packs or cartridges is kept segregated instead of entering a common manifold or header with the rest of the permeate from the other discs or cartridges. The device may also be designed to allow individual filter packs or cartridges to be fluidly isolated from the other filter packs or cartridges, for example, by using a valve on the permeate collection piping leaving each filter pack or cartridge. That would be useful, for example, if there were a leak in one filter pack or cartridge that allowed feed fluid to enter the permeate collection system of the leaking filter pack or cartridge. In that case, the valve for the leaking filter pack or cartridge could be closed to isolate that leaking filter pack or cartridge and prevent contamination of the rest of the permeate and/or a loss of feed fluid.

We claim:

1. A rotary filtration device for filtering fluid into permeate and retentate, said device comprising (a) a readily insertable and removable filter pack, the filter pack being essentially stationary in the device during normal operation and comprising a first filter and a permeate collection member having a first major surface, the first filter being adjacent the first major surface; (b) a permeate collection header; (c) a first rotating member; and (d) a rotatable shaft having a longitudinal axis to which shaft the rotating member is attached and by which shaft it is rotated during normal operation; the first rotating member being near the first filter to define a first fluid filtration gap therebetween when the filter pack is in its normal operating position in the device; the permeate collection member having at least one passageway for permeate and also having fluid connection means for fluidly connecting the passageway to the permeate collection header when the filter pack is in its normal operating position so that permeate that passes from the fluid filtration gap through the filter and into the passageway of the permeate collection member can flow into the permeate collection header during normal operation; the device having means to allow the filter pack to be readily inserted into and removed from its normal operating position in the device by moving the filter pack in a direction generally perpendicular to the longitudinal axis of the shaft and provide an alternative to having to move the rotating member out of the path of the filter pack during its insertion or removal.

2. The rotary filtration device of claim 1 further comprising means for automatically fluidly connecting the fluid connection means to the permeate collection header as the filter pack is inserted into its normal operating position in the device.

3. The rotary filtration device of claim 1 wherein the first filter of the filter pack is substantially perpendicular to the longitudinal axis of the shaft.

4. The rotary filtration device of claim 1 further comprising means for feeding fluid to the first fluid filtration gap.

5. The rotary filtration device of claim 4 further comprising a member that comprises at least part of the permeate collection header and at least part of the means for feeding fluid to the first fluid filtration gap.

6. The rotary filtration device of claim 1 wherein the first major surface of the filter pack is generally D-shaped.

7. The rotary filtration device of claim 6 wherein the permeate collection member further comprises a generally straight and planar member, the fluid connection means comprises at least part of that member, and that member is adjacent the permeate collection header when the filter pack is in its normal operating position in the device.

8. The rotary filtration device of claim 7 wherein the permeate collection header is at least partially inside the device and is proximal the rotatable shaft of the device, and the fluid connection means of the filter pack connects to the permeate collection header inside the device.

9. The rotary filtration device of claim 8 further comprising (a) means for feeding fluid to the first fluid filtration gap near the shaft and (b) a member that comprises at least part of the permeate collection header and at least part of the means for feeding fluid to the first fluid filtration gap.

10. The rotary filtration device of claim 6 comprising two readily insertable and removable generally D-shaped filter packs, each of the two filter packs having a periphery comprising an essentially straight portion and a cutout to provide clearance for the shaft; wherein when the two filter packs are in their normal operating positions in the device, they lie in substantially the same plane, their respective straight portions are adjacent one another, and their two cutouts are adjacent the shaft but spaced therefrom to form an open region around the shaft.

11. The rotary filtration device of claim 10 wherein the straight portion of the periphery of each filter pack comprises an elongate recess in communication with the cutout so that when the two filter packs lie with their respective straight portions adjacent one another, the two elongate recesses of the two filter packs form a passageway for the fluid to be filtered so that the fluid to be filtered can be delivered to the open region around the shaft.

12. The rotary filtration device of claim 1 wherein the first major surface of the permeate collection member is generally circular, has a center, and contains a radial cutout extending from its circumference to at least its center, the cutout having a side surface and being sufficiently large to provide clearance for the rotatable shaft when the filter pack is inserted into its normal operating position.

13. The rotary filtration device of claim 12 wherein the rotary filtration device further comprises a first member that fits within the radial cutout when the filter pack is inserted into its normal operating position in the rotary filtration device, the first member having means to help maintain the filter pack in its normal operating position in device.

14. The rotary filtration device of claim 13 wherein the first member that fits within the radial cutout and the side surface of the cutout comprise means that cooperate with each other to allow the filter pack to be slid into and out of the device in a direction generally perpendicular to the longitudinal axis of the shaft for inserting the filter pack into and removing it from its normal operating position in the device and for maintaining the filter pack in its normal operating position in the device.

15. The rotary filtration device of claim 13 wherein the first member that fits within the radial cutout further comprises means for feeding fluid to be filtered to the fluid filtration ga near the rotatable shaft.

16. The rotary filtration device of claim 1 wherein the permeate collection member further comprises a second major surface, the filter pack further comprises a second filter adjacent the second major surface, and the two filters of the filter pack are substantially parallel.

17. The rotary filtration device of claim 1 comprising a plurality of filter packs and a plurality of rotating members in alternating interleaved arrangement to define a plurality of fluid filtration gaps.

18. The rotary filtration device of claim 1 wherein the permeate collection member further comprises means to allow gas within its passageway to be removed.

19. The rotary filtration device of claim 1 wherein the longitudinal axis of the shaft is generally horizontal when the device is in its normal operating position, the first filter of the filter pack is generally vertical when the filter pack is in its normal operating position in the device, and the fluid connection means for conveying permeate from the permeate collection member to the permeate collection header is located near the bottom of the permeate collection member when it is in its normal operating position in the device.

20. The rotary filtration device of claim 19 wherein the permeate collection member further comprises gas discharge means to allow gas within the passageway of the permeate collection member to be removed, said means being located near the top of the permeate collection member when it is in its normal operating position in the device and the device is in its normal operating position.

21. The rotary filtration device of claim 20 further comprising a gas removal header fluidly connected to the gas discharge means to help remove gas from the passageway of the permeate collection member.

22. The rotary filtration device of claim 21 wherein the gas removal header is located on the outside of the rotary filtration device.

23. The rotary filtration device of claim I further comprising entry means which can be in an open position or in a closed position and which when in the open position allows the filter pack to be inserted into or removed from the rotary filtration device and which when in the closed position helps maintain the filter pack in its normal operating position.

24. The rotary filtration device of claim 23 wherein the entry means when in its closed position helps maintain the fluid connection of the fluid connection means to the permeate collection header.

25. A readily insertable and removable filter pack for use in a rotary filtration device for filtering fluid into permeate and retentate, the filter pack being essentially stationary in the device during normal operation and comprising first and second filters and a permeate collection member having first and second major surfaces and a third surface, the first filter being adjacent the first major surface and the second filter being adjacent the second major surface; said device having a permeate collection header, first and second rotating members, and a rotatable shaft having a longitudinal axis to which shaft the rotating members are attached and by which shaft they are rotated during normal operation; the first rotating member being near the first filter to define a first fluid filtration gap therebetween and the second rotating member being near the second filter to define a second fluid filtration gap therebetween when the filter pack is in its normal operating position in the device; the permeate collection member having at least one passageway for permeate and also having fluid connection means in its third surface for fluidly connecting the passageway to the permeate collection header when the filter pack is in its normal operating position so that permeate that passes from the fluid filtration gaps through the filters and into the passageway of the permeate collection member can flow into the permeate collection header during normal operation; the device and the filter pack having means to allow the filter pack to be readily inserted into and removed from its normal operating position in the device and provide an alternative to having to move the rotating members out of the path of the filter pack during its insertion or removal.

26. The filter pack of claim 25 further comprising means for automatically fluidly connecting the fluid connection means to the permeate collection header as the filter pack is inserted into its normal operating position in the rotary filtration device.

27. The filter pack of claim 25 wherein the first and second major surfaces of the permeate collection member are substantially parallel and the third surface is substantially perpendicular to them.

28. The filter pack of claim 25 wherein the surfaces and fluid connection means of the filter pack are oriented so that after the filter pack is in its normal operating position in the device, the two filters of the filter pack are substantially perpendicular to the longitudinal axis of the shaft.

29. The filter pack of claim 25 wherein the first and second major surfaces are generally D-shaped.

30. The filter pack of claim 29 wherein the first and second major surfaces are spaced apart and the third surface comprises a generally straight and planar member between them that is substantially perpendicular to them.

31. The filter pack of claim 29 wherein the first and second major surfaces are spaced apart and the third surface comprises a generally straight member between them having a cutout to provide clearance for the shaft and having an elongate recess that communicates with the cutout, the recess helping to form a passageway for the fluid to be filtered when the filter pack is in its normal operating position in the device.

32. The filter pack of claim 29 wherein the permeate collection header of the rotary filtration device is at least partially inside the device and is proximal the rotatable shaft of the device, and the fluid connection means of the filter pack connects to the header of the device inside the device.

33. The filter pack of claim 25 wherein the permeate collection member contains a cutout having a side surface and the cutout is sufficiently large to provide clearance for the rotatable shaft when the filter pack is inserted into its normal operating position.

34. The filter pack of claim 33 wherein the rotary filtration device further comprises a first member that fits within the cutout when the filter pack is inserted into its normal operating position in the rotary filtration device, the first member that fits within the cutout and the side surface of the cutout comprising means that cooperate with each other to allow the filter pack to be slid into and out of the device in a direction generally perpendicular to the longitudinal axis of the shaft for inserting the filter pack into and removing it from its normal operating position in the device and for maintaining the filter pack in its normal operating position in the device.

35. A cartridge for a rotary filtration device comprising a plurality of the filter packs of any one of claims 25 to 34 wherein the filter packs are structurally connected so that they can be readily inserted into and removed from the device as a unit.

36. The cartridge of claim 35 further comprising means to fluidly connect to each other the permeate passageways of two or more of the filter packs in the cartridge.

37. A rotary filtration device comprising the cartridge of claim 35.

* * * * *

UNITED STATES PATENT AND TRADEMARK OFFICE
CERTIFICATE OF CORRECTION

PATENT NO. : 5,254,250

DATED : October 19, 1993

INVENTOR(S) : Philip M. Rolchigo et al

It is certified that error appears in the above-indentified patent and that said Letters Patent is hereby corrected as shown below:

Column 8, line 68: After "parallel" add a period --.--;

Column 9, line 16: "norma" should read --normal--;

Column 19, line 18: "o" should read --other--;

Column 19, line 40: "5,143,639" should read --5,143,630--;

Column 19, line 41: "o" should read --observed--;

Column 27, line 42: "ga" should read --gap--.

Signed and Sealed this

Twelfth Day of April, 1994

Attest:

BRUCE LEHMAN

*Attesting Officer*     Commissioner of Patents and Trademarks